US011449763B2

(12) United States Patent
de Nijs et al.

(10) Patent No.: US 11,449,763 B2
(45) Date of Patent: Sep. 20, 2022

(54) MAKING RESOURCE-CONSTRAINED SEQUENTIAL RECOMMENDATIONS

(71) Applicant: Adobe Inc., San Jose, CA (US)

(72) Inventors: Frits de Nijs, Nootdorp (NL); Georgios Theocharous, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1152 days.

(21) Appl. No.: 15/914,285

(22) Filed: Mar. 7, 2018

(65) Prior Publication Data
US 2019/0279096 A1    Sep. 12, 2019

(51) Int. Cl.
*G06F 16/951* (2019.01)
*G06N 5/02* (2006.01)

(52) U.S. Cl.
CPC ............. *G06N 5/02* (2013.01); *G06F 16/951* (2019.01)

(58) Field of Classification Search
CPC .................................. G06N 5/02; G06F 16/951
See application file for complete search history.

(56) References Cited

U.S. PATENT DOCUMENTS

| | | | | |
|---|---|---|---|---|
| 8,468,041 B1* | 6/2013 | Vengerov | ......... | G06Q 10/06313 705/7.11 |
| 2008/0027803 A1* | 1/2008 | Mendelevitch | .... | G06Q 30/0249 705/14.48 |
| 2009/0112691 A1* | 4/2009 | Abrams | ................. | G06Q 40/04 705/14.71 |
| 2016/0350802 A1* | 12/2016 | Mehanian | .......... | G06Q 30/0254 |
| 2017/0032245 A1* | 2/2017 | Osband | ..................... | G06N 3/08 |
| 2017/0032248 A1* | 2/2017 | Dotan-Cohen | ....... | H04L 67/306 |
| 2018/0129971 A1* | 5/2018 | Vlassis | ............. | G06Q 30/0255 |
| 2018/0165590 A1* | 6/2018 | Vlassis | .................. | G06N 5/045 |
| 2018/0342004 A1* | 11/2018 | Yom-Tov | ................. | G06N 7/08 |

OTHER PUBLICATIONS

Guez et al., "Scalable and Efficient Bayes-Adaptive Reinforcement Learning Based on Monte-Carlo Tree Search", 2013, Journal of Artificial Intelligence Research, 48, 841-883 (Year: 2013).*

(Continued)

*Primary Examiner* — Li Wu Chang
(74) *Attorney, Agent, or Firm* — Keller Preece PLLC

(57) ABSTRACT

The present disclosure relates to recommending points of interest to a plurality of users based on a type of each user as well as constraints associated with the points of interest. For example, one or more embodiments determine a user type for each user and determine user preferences based on the user type. Additionally, the system can determine resource constraints associated with each point of interest, indicating limitations on the capacity of each associated resource. The system can then provide recommendations to the plurality of users based on the user types and the resource constraints. In particular, the system can recommend points of interest that satisfy the preferences corresponding to each user type subject to the resource constraints of each point of interest. For example, one or more embodiments involve solving a linear program that takes into account user types to obtain recommendation policies subject to the resource constraints.

20 Claims, 15 Drawing Sheets

(56) References Cited

OTHER PUBLICATIONS

Albrecht et al., "Multiagent Learning", 2017, IJCAI 2017 Conference (Year: 2017).*

Chatwin, "An Overview of Computational Challenges in Online Advertising", Jun. 17-19, 2013, 2013 American Control Conference (ACC), 5991-6007 (Year: 2013).*

Eitan Altman. 1999. Constrained Markov Decision Processes. Chapman & Hall/CRC.

Mauricio Araya-López, Vincent Thomas, Olivier Buffet, and François Charpillet. 2010. A Closer Look at MOMDPs. In ICTAI. 197-204. https://doi.org/10.1109/ ICTAI.2010.101.

Raphen Becker, Shlomo Zilberstein, Victor Lesser, and Claudia V. Goldman. 2004. Solving Transition Independent Decentralized Markov Decision Processes. Journal of Artificial Intelligence Research 22 (2004), 423-455. https://doi.org/10.1145/860575.860583.

Robert Bell, Yehuda Koren, and Chris Volinsky. 2007. Chasing $1,000,000: how we won the Netflix progress prize. Statistical Computer & Graphics 12, 2 (Dec. 2007), 4-12.

Richard Bellman. 1957. A Markovian Decision Process. Journal of Mathematics and Mechanics 6, 5 (1957), 679-684.

Daniel S. Bernstein, Robert Givan, Neil Immerman, and Shlomo Zilberstein. 2002. The Complexity of Decentralized Control of Markov Decision Processes. Mathematics of Operations Research 27, 4 (2002), 819-840. https://doi.org/10.1287/moor.27.4.819.297.

Craig Boutilier. 1996. Planning, Learning and Coordination in Multiagent Decision Processes. In Proceedings of the 6th Conference on Theoretical Aspects of Rationality and Knowledge. 195-210.

Shih-Fen Cheng, Larry Lin, Jiali Du, Hoong Chuin Lau, and Pradeep Varakantham. 2013. An agent-based simulation approach to experience management in theme parks. In Winter Simulation Conference. 1527-1538. https://doi.org/10.1109/WSC. 2013. 6721536.

Frits de Nijs, Erwin Walraven, Mathijs M. de Weerdt, and Matthijs T. J. Spaan. 2017. Bounding the Probability of Resource Constraint Violations in Multi-Agent MDPs. In Proceedings of the 31st AAAI Conference on Artificial Intelligence. 3562-3568.

Michael O'Gordon Duff. 2002. Optimal learning: Computational procedures for Bayes-adaptive Markov decision processes. Ph.D. Dissertation. University of Massachusetts Amherst.

P. C. Gilmore and R. E. Gomory. 1961. A Linear Programming Approach to the Cutting-Stock Problem. Operations Research 9, 6 (1961), 849-859. https://doi.org/10.1287/opre.9.6.849.

Aditya Gopalan and Shie Mannor. 2015. Thompson Sampling for Learning Parameterized Markov Decision Processes. In Proceedings of the 28th Conference on Learning Theory (Proceedings of Machine Learning Research), Peter Grünwald, Elad Kazan, and Satyen Kale (Eds.), vol. 40. PMLR, Paris, France, 861-898. http://proceedings.mlr.press/v40/Gopalan15.html.

Leslie Pack Kaelbling, Michael L. Littman, and Anthony R. Cassandra. 1998. Planning and acting in partially observable stochastic domains. Artificial Intelligence 101, 1-2 (May 1998), 99-134. https://doi.org/10.1016/S0004-3702(98)00023-X.

Sham Machandranath Kakade. 2003. On the Sample Complexity of Reinforcement Learning. Ph.D. Dissertation. University College London.

Hanna Kurniawati, David Hsu, and Wee Sun Lee. 2008. SARSOP: Efficient Point- Based POMDP Planning by Approximating Optimally Reachable Belief Spaces. In Robotics: Science and Systems. Zurich, Switzerland. https://doi.org/10.15607/RSS.2008.IV.009.

Peron Martin, Kai Helge Becker, Peter Bartlett, and Iadine Chades. 2017. Fast-Tracking Stationary MOMDPs forAdaptive Management Problems. In Proceedings of the 31st AAAI Conference on Artificial Intelligence. 4531-4537.

Nicolas Meuleau, Milos Hauskrecht, Kee-eung Kim, Leonid Peshkin, Leslie Pack Kaelbling, Thomas Dean, and Craig Boutilier. 1998. Solving Very Large Weakly Coupled Markov Decision Processes. In Proceedings of the 15th National Conference on Artificial Intelligence. 165-172.

Sylvie C. W. Ong, Shao Wei Png, David Hsu, and Wee Sun Lee. 2010. Planning under Uncertainty for Robotic Tasks with Mixed Observability. The International Journal of Robotics Research 29, 8 (2010), 1053-1068. https://doi.org/10.1177/0278364910369861.

Ian Osband and Benjamin Van Roy. 2014. Near-optimal Reinforcement Learning in Factored MDPs. In Advances in Neural Information Processing Systems 27, Z. Ghahramani, M. Welling, C. Cortes, N. D. Lawrence, and K. Q. Weinberger (Eds.). Curran Associates, Inc., 604-612. http://papers.nips.cc/paper/5445-near-optimal-reinforcement-learning-in-factored-mdps.pdf.

Christos H. Papadimitriou and John N. Tsitsiklis. 1987. The Complexity of Markov Decision Processes. Mathematics of Operations Research 12, 3 (1987), 441-450. https://doi.org/10.1287/moor.12.3. 441.

Pascal Poupart, Aarti Malhotra, Pei Pei, Kee-Eung Kim, BongseokGoh, and Michael Bowling. 2015. Approximate Linear Programming for Constrained Partially Observable Markov Decision Processes. In Proceedings of the 29th AAAI Conference on Artificial Intelligence. 3342-3348.

Dana Ron, Yoram Singer, and Naftali Tishby. 1996. The Power of Amnesia: Learning Probabilistic Automata with Variable Memory Length. Machine Learning 25 (1996), 117-149. https://doi.org/10.1007/BF00114008.

Guy Shani, David Heckerman, and Ronen I. Brafman. 2005. An MDP-Based Recommender System. Journal of Machine Learning Research 6 (2005), 1265-1295.

Harald Steck. 2013. Evaluation of Recommendations: Rating-prediction and Ranking. In Proceedings of the 7th ACM Conference on Recommender Systems (RecSys '13). ACM, New York, NY, USA, 213-220. https://doi.org/10.1145/2507157.2507160.

Georgios Theocharous, Nikos Vlassis, and Zheng Wen. 2017. An Interactive Points of Interest Guidance System. In Proceedings of the 22nd International Conference on Intelligent User Interfaces Companion (IUI '17 Companion). ACM, New York, NY, USA, 49-52. https://doi.org/10.1145/3030024.304098.

William R. Thompson. 1933. On the Likelihood that One Unknown Probability Exceeds Another in View of the Evidence of Two Samples. Biometrika 25, 3/4 (1933), 285-294. https://doi.org/10. 2307/2332286.

Kirk A. Yost and Alan R.Washburn. 2000. The LP/POMDP Marriage: Optimization with Imperfect Information. Naval Research Logistics 47, 8 (2000), 607-619. https://doi.org/10.1002/1520-6750(200012)47:8<607::AID-NAV1>3.0.CO;2-F.

Qi Zhang, Edmund Durfee, and Satinder P. Singh. 2017. Minimizing Maximum Regret in Commitment Constrained Sequential Decision Making. In Proceedings of the 27th International Conference on Automated Planning and Scheduling, Laura Barbulescu, Jeremy Frank, Mausam, and Stephen F. Smith (Eds.).

M. L. Littman, A. R. Cassandra, and L. P. Kaelbling. "Learning policies for partially observable environments: Scaling up". In: ICML. 1995, pp. 362-370.

E. Walraven and M. T. J. Spaan. "Accelerated Vector Pruning for Optimal POMDP Solvers". In AAAI. 2017, pp. 3672-3678.

C. Barnhart, E. L. Johnson, G. L. Nemhauser, M. W. Savelsbergh, and P. H. Vance. "Branch-and-price: Column generation for solving huge integer programs". In: Operations research 46.3 (1998), pp. 316-329.

C. Boutilier and T. Lu. "Budget Allocation using Weakly Coupled, Constrained Markov Decision Processes". In: UAL 2016, pp. 52-61.

G. J. Gordon, P. Varakantham, W. Yeoh, H. C. Lau, A. S. Aravamudhan, and S.-F. Cheng. "Lagrangian Relaxation for Large-Scale Multiagent Planning". In: WI-IAT. 2012, pp. 494-501.

* cited by examiner

MAKING RESOURCE-CONSTRAINED SEQUENTIAL RECOMMENDATIONS

BACKGROUND

Recommender systems have become increasingly important to engage users and to filter points of interest, object, or actions that are otherwise too numerous to explore thoroughly. For example, when visiting an amusement park having several attractions, a visitor unfamiliar with the park may feel overwhelmed in deciding which attractions to visit within the limited time available. Consequently, the visitor risks allocating time to attractions that are of little actual interest and may leave the amusement park unsatisfied. Similarly, a user visiting an online news, movie, or other content provider may feel overwhelmed by the number of potential content items, causing the user to waste time finding a desirable item or to leave the site frustrated. A recommender system may avoid such problems by recommending particular points of interest, actions, or objects to users. For example, a recommender system may recommend the most popular points of interest, actions, or objects to a user, providing the information necessary to make better use of the user's limited time.

Despite these advantages, conventional recommender systems have several technological shortcomings that create inaccurate and inefficient operation. For example, one of the primary challenges that recommender systems face is the discovery of a user's preferences. Conventional recommender systems typically model this problem as bandit models or click models. Such models aim to minimize regret incurred from taking exploratory actions. Unfortunately, such conventional systems and models are not able to capture contextual history in actions taken over several time steps. To address this shortcoming, some conventional recommender systems cast the problem as a reinforcement learning problem. Unfortunately, general reinforcement learning tasks have a high sample complexity, requiring long interaction periods before a good model fit is obtained. The large computing resources and processing time constraints of conventional reinforcement learning based recommender system make such systems unsuitable in situations that need to match the users' interests quickly to avoid losing their attention (e.g., most online settings).

Many simpler conventional recommender systems that do not have the foregoing computing resources and processing time constraints, often fail to take into account relations between points of interest, actions, or objects and the history of the user. Failing to account for such relations create inaccuracies and inefficiencies in recommendations. For example, when recommending news articles to readers, the user's history informs familiarity with a topic, and thereby, the value of a contextual article over a latest update. Also, when recommending points-of-interest to tourists, in order to exploit locality and avoid asking the user to backtrack, recommendations should be considered as a sequence.

In addition to the foregoing, another drawback of conventional recommender systems is a failure to account for capacity. For instance, some conventional recommender systems may make recommendations without regard to capacity, which leads to infrastructure overloading and associated problems. As an example, conventional systems generally risk overloading a server by generating too many recommendations that will be directed to the server. In particular, the technical limitations of servers hosting online content can limit the number of users that can be serviced at any given time. If the conventional recommender system recommends content hosted by a particular server when that server is at or near full capacity, the addition of the new users can overload the server. Consequently, the server can fail (e.g., crash) or experience severe slowdown in its operation.

SUMMARY

One or more embodiments described herein provide benefits and/or solve one or more of the foregoing or other problems in the art with systems, methods, and non-transitory computer readable storage media that improve computing systems that make sequential recommendations based on user type, as well as, system constraints. In particular, one or more embodiments involve determining a user type for each user and determining user preferences based on the user type. Additionally, the disclosed systems analyze resource data to determine resource constraints. The disclosed systems then provide sequential recommendations to users based on the user type and the resource constraints. Indeed, the disclosed systems makes recommendations that satisfy the preferences corresponding to each user type subject to the resource constraints.

To illustrate, in one or more embodiments, a system determines a user type for each user and infers, from that type, the interests of the user. For example, one or more embodiments use Thompson sampling to make an initial assumption of the user's type and generate recommendations as if the assumed type is the user's true type. Alternatively, the system can generate a recommendation policy for a user based on a model incorporating all potential types of the user. In particular, the system merges the models for all of the user's potential types into a single Mixed-Observability Markov Decision Process and determines the user's type based on the merged model. Subsequently, the system can solve a linear program based on the belief over the user's type and the resource constraints to obtain a mix of recommendation policies for each user. In one or more embodiments, the system solves the linear program further based on a plurality of expected resource consumptions, the sequential history of user actions for each user, and the current state of each user.

The following description sets forth additional features and advantages of one or more embodiments of the disclosed systems, methods, and computer readable storage media. In some cases, such features and advantages will be obvious to a skilled artisan from the description or may be learned by the practice of the disclosed embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
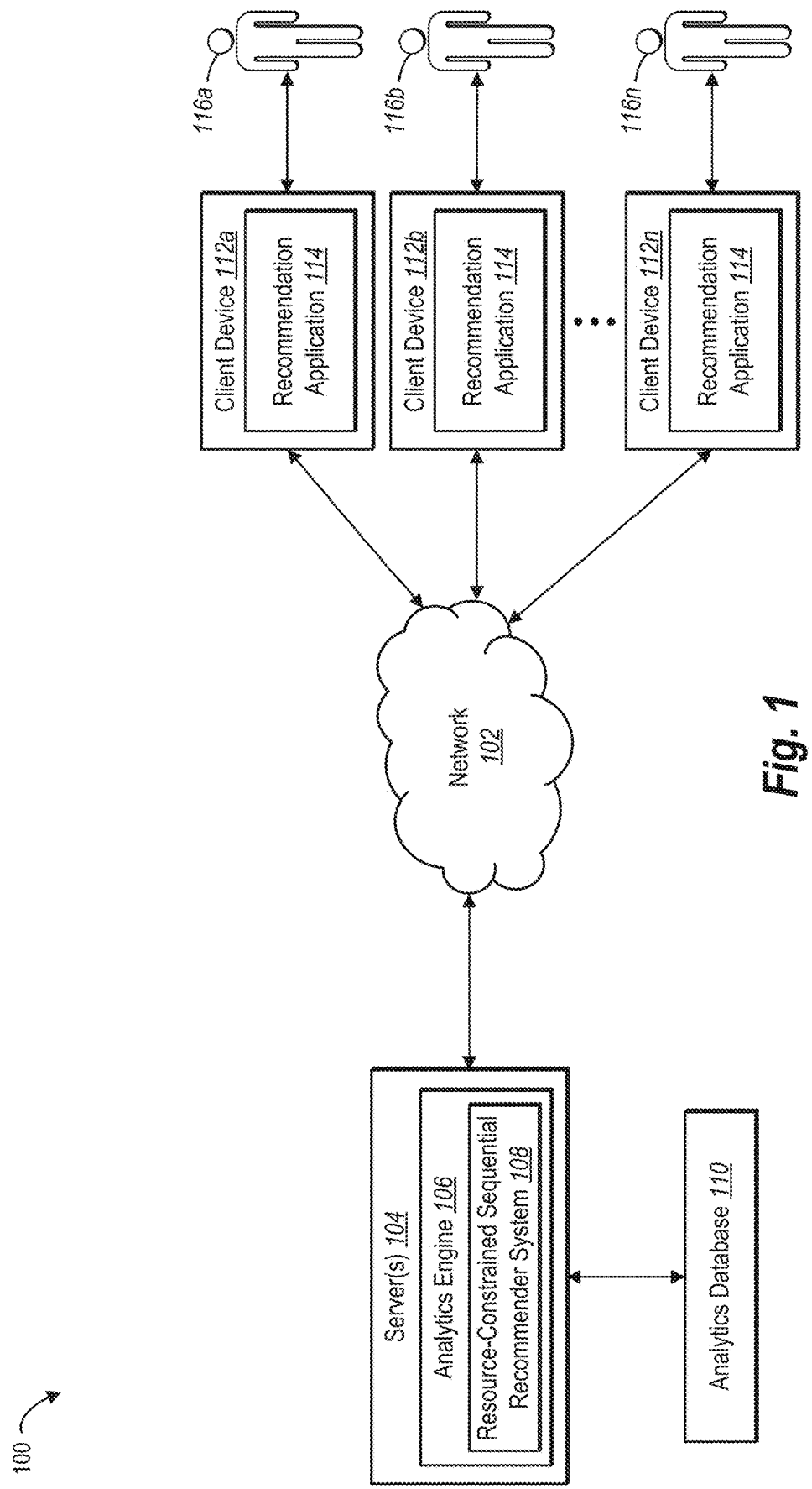
FIG. 1 illustrates a schematic diagram of an example environment in which a resource-constrained sequential recommender system can operate in accordance with one or more embodiments.

One or more embodiments described herein include a resource-constrained sequential recommender system for making a recommendation to a user based on the user's interests as well as the constraints associated the system. For example, one or more embodiments analyze user data to determine an initial type for each user and infer, from that type, the interests of that user. The resource-constrained sequential recommender system can then build a multi-agent recommender problem based on each user's type as well as the system constraints. In some embodiments, the resource-constrained sequential recommender system further builds the multi-agent recommender problem on additional factors, such as the expected consumption of the resources the sequential history of each user's actions, and the current state of each user. By solving the multi-agent recommender problem, the resource-constrained sequential recommender system obtains a mix of recommendation policies for the users. One or more embodiments obtain this solution by solving a linear program which provides a mix of policies based on the constraints on each resource.

In general, the resource-constrained sequential recommender system builds a model that produces a recommendation strategy for a user based on that user's type. In particular, the model is built to match the user's interests quickly to encourage the user to maintain engagement with the system. However, the user's type is generally hidden, so the resource-constrained sequential recommender system generates recommendations based on a belief of the user's type. In particular, the resource-constrained sequential recommender system may employ one or more methods of determining and updating the belief regarding the user's type in order to generate recommendations that more closely match the user's true interests. Further, the resource-constrained sequential recommender system builds the model to generate recommendations for all users of the system simultaneously, allowing the system to account for capacity limitations. In other words, by generating recommendations for all users at the same time, the system can track the consumption of each resource associated with the available recommendations and avoid generating recommendations that cause capacity overloading.

As further above, the resource-constrained sequential recommender system generates recommendations based, at least partly, on the user's type and capacity limitations of the system for which the recommendations are being made. In one or more embodiments, the resource-constrained sequential recommender system builds a Constrained Partially Observable Markov Decision Process (hereinafter referred to as "CPOMDP") to integrate the user's type and capacity limitations into a single model. In particular, the resource-constrained sequential recommender system combines a Parametric Markov Decision Process (hereinafter referred to as "Parametric MDP"—which models state transitions based on the user's type—and a Constrained Multi-agent Markov Decision Process (hereinafter referred to as "Constrained MDP")—which models state transitions based on multiple agents acting under resource constraints—into a single CPOMDP model. By solving the CPOMDP the resource-constrained sequential recommender system obtains a recommendation policy for each user associated with the system.

Unfortunately, the complexity of solving CPOMDPs prevents finding of optimal policies for realistic problem sizes using conventional methods. To address this challenge, the resource-constrained sequential recommender system utilizes one of two novel algorithms. In particular, the resource-constrained sequential recommender system extends Thompson sampling to the multi-agent, constrained setting. Conventional Thompson sampling is a heuristic that attends a bounded expected regret in the single-agent, unconstrained setting. Alternatively, the resource-constrained sequential recommender system exploits the structural properties of the recommendation problem to approximately solve the CPOMDP by computing the worst-case regret of switching from a recommendation strategy over a belief over types to an optimal strategy for a given type, which can bound the size of the state space. The resource-constrained sequential recommender system uses either approach as a subroutine in a column generation algorithm, which computes policies satisfying the constraints through an application of a Lagrangian decomposition, as explained in greater detail below.

More particularly, as mentioned above, one or more embodiments of the resource-constrained sequential recommender system operate in an environment in which the user's type is hidden. Therefore, the resource-constrained sequential recommender system employs methods of determining and updating a belief in a user's type that will result in a recommendation policy that best accommodates that type. For example, in one or more embodiments, the resource-constrained sequential recommender system makes an initial determination of the user's type and then learns the user's true type as it provides recommendations. In particular, the resource-constrained sequential recommender system extends Thompson sampling to the setting of constrained resources to learn the user's true type for the CPOMDP solution. In accordance with Thompson sampling, the resource-constrained sequential recommender system makes recommendations to a user based on an initially sampled type of that user. When the user responds to the recommendation, the resource-constrained sequential recommender system determines whether the response correlates with the initial sampled type. If the user's response indicates that the user is of a different type, the resource-constrained sequential recommender system updates its sample of the user type. The resource-constrained sequential recommender system repeats this process until the sampled type converges with the user's true type, allowing for recommendations to be those most accommodating to the true type.

In some embodiments, the system generates a recommendation policy for a user based on all potential types of that user. In particular, the resource-constrained sequential recommender system models each user type as a Markov Decision Process (hereinafter referred to as "MDP") where the solution represents a recommendation policy for that user type. The resource-constrained sequential recommender system can combine the MDP for each user type into a single Mixed-Observability MDP (hereinafter referred to as "MOMDP"). By solving the MOMDP, the resource-constrained sequential recommender system obtains an approximate solution to the CPOMDP. In one or more embodiments, the resource-constrained sequential recommender system solves the MOMDP by computing the worst-case regret of switching from a recommendation policy over a belief over types to an optimal strategy for a given type. In doing so, the resource-constrained sequential recommender system bounds the size of the state space.

Additionally, as mentioned above, the resource-constrained sequential recommender system makes recommendations to a user based on the constraints of the system. In particular, the constraints relate to the capacity limitations of the resources associated with each recommendation (e.g., point of interest capacities, server capacity, etc.). In one or more embodiments, the resource-constrained sequential recommender system analyzes resource data to determine information relevant to the capacity limitations. For example, the resource-constrained sequential recommender system can analyze resource data to determine the total current capacity for that resource. Additionally, or alternatively, the resource-constrained sequential recommender system may analyze resource data to determine how much of the total current capacity is currently in use.

As mentioned, the resource-constrained sequential recommender system can solve the multi-agent recommender problem using a linear program that takes into account the user's type and the constraints on each point of interest. In some embodiments, the linear program further takes into account the expected consumption of the resources, the sequential history of each user's actions, and the current state of each user. In particular, by solving the linear program, the resource-constrained sequential recommender system obtains a mix of recommendation policies for the users as well as a set of dual costs. The resource-constrained sequential recommender system can then input the dual costs into a planner algorithm that provides a new policy for each of the users. In particular, the resource-constrained sequential recommender system can use the new policy as part of an available policy set for a user used as a parameter by the linear program. By solving the linear program and the planner algorithm until the costs obtained from the linear program have converged, the recommender problem can provide an optimal recommendation policy for each user.

The resource-constrained sequential recommender system provides several advantages over conventional systems. For example, by personalizing the recommendation policy to accommodate the user's type, the system generates recommendations that more accurately conform to a user's needs, providing a greater likelihood of engaging the user. To illustrate this advantage, if an adult user is visiting an amusement park without accompanying children, the resource-constrained sequential recommender system will avoid recommending children's attractions to the user. Instead, the resource-constrained sequential recommender system will focus its recommendation policy on adult-oriented attractions or another category of attractions that best accommodate the user's type. Consequently, the resource-constrained sequential recommender system encourages the user to remain engaged with the system in hopes of continually receiving relevant recommendations.

Additionally, the resource-constrained sequential recommender system provides more efficient service to users as it avoids making recommendations that will lead to capacity overloads. For example, a long queue at a first amusement park attraction may indicate that the attraction is currently operating beyond its capacity. While a conventional system may recommend the first attraction to a user regardless of the queue—causing the attraction to operate further beyond capacity and causing long wait times for the user—the resource-constrained sequential recommender system will avoid recommending that particular attraction at that time, even if it aligns with the user's interests. Instead, the resource-constrained sequential recommender system may recommend an alternate attraction with available capacity and may later recommend the first attraction when it has capacity available. Further, the resource-constrained sequential recommender system will avoid recommending the same point of interest to too many users at the same time. Specifically, even if an amusement park attraction has some capacity available to service users, the resource-constrained sequential recommender system may avoid recommending that attraction to a number of users that exceeds the available capacity, further ensuring that a user will not endure long wait times by following the recommendation.

Because the resource-constrained sequential recommender system avoids causing points of interest to operate beyond capacity, the resource-constrained sequential recommender system may avoid problems associated with overloading computer systems. As mentioned, a server hosting several items of interest may fail (e.g., crash) or experience severe slowdown when operating near or beyond capacity. While a conventional system may continue to recommend content hosted by a server regardless of this risk, the resource-constrained sequential recommender system will avoid recommending content hosted by the server if the server is operating at or near capacity. Therefore, the resource-constrained sequential recommender system allows the server to maintain efficient service of users.

As illustrated by the foregoing discussion, the present disclosure uses a variety of terms to describe features and benefits of the resource-constrained sequential recommender system. Additional detail is now provided regarding the meaning of these terms. As used herein, the term "recommendation" refers to a point of interest that the resource-constrained sequential recommender system can recommend to a user. As used herein a point of interest refers to a location, object, content item, or action. In particular, a point of interest can refer to a digital or physical location that can be visited by a user of the resource-constrained sequential recommender system. For example, a point of interest can include an attraction at an amusement park, tourist attractions located in a city (e.g., museums, monuments, parks, etc.), websites, or particular content items of an online service (e.g., links, web pages, videos, interactive segments, etc.).

Additionally, as used herein, the term "resource data" refers to data associated with a recommendation. In particular, resource data refers to data providing details regarding a resource associated with a recommendation. For example, resource data can include data regarding a current use of a resource, a maximum capacity of a resource, a description or characterization of a resource, or interests that may be satisfied by a resource. Further, as used herein, the term "resource constraint" refers to limitations of a resource. In particular, resource constraints refer to limitations on a capacity of a resource associated with a recommendation. For example, resource constraints can include capacity limitations due to a size or quantity of a resource, an efficiency of a resource, a length of operation of a resource, a durability of a resource, or a demand of a resource.

Additionally, as used herein, the term "sequential history of user actions" refers to past user actions. In particular, sequential history of user actions refers to a collection of user actions ordered based on how those actions relate to one another in time. For example, a sequential history of user actions includes a timeline, a schedule, an infographic, or a list detailing the action and the time at which it took place. More particularly, a sequential history of user actions can refer to user actions associated with recommendations.

Further, as used herein, the term "state transitions" refers to changes in condition. In particular, state transitions refer to changes from a previous state to a subsequent state. For example, a state transition can include a change in location between various points of interest tracked by a resource-constrained sequential recommender system and a time at which those changes occur. To illustrate, a state transition can include moving from a previous point of interest to a subsequent point of interest, leaving a previous point of interest without moving to a subsequent point of interest, or moving to a point of interest without having left a previous point of interest.

Further, as used herein, the term "state of a user" refers to a condition of a user. In particular, state of a user refers to a location of a user with respect to one of a plurality of points of interest and a time at which the user is at the location. For example, a current state of a user can include the current location of the user with respect to one of the plurality of points of interest and the current time.

Referring now to the figures, FIG. 1 illustrates an embodiment of an environment 100 in which a resource-constrained sequential recommender system 108 operates. Specifically, the environment 100 includes server(s) 104, an analytics database 110, and client devices 112a-112n associated with users 116a-116n communicating over a network 102. Although the environment 100 of FIG. 1 is depicted as having various components, the environment 100 may have any number of additional or alternative components (e.g., any number of servers, client devices, databases, or other components in communication with the resource-constrained sequential recommender system 108 via the network 102). Accordingly, the resource-constrained sequential recommender system 108 can analyze data from any number of databases to generate a recommendation for anyone of users 116a-116n. Furthermore, more than one component or entity in environment 100 can implement the operations of the resource-constrained sequential recommender system 108 described herein. To illustrate, the resource-constrained sequential recommender system 108 can alternatively be implemented, in part or in whole, by the user client devices 112a-112n and/or be part of another component or system.

According to one or more embodiments, the resource-constrained sequential recommender system 108 can be implemented in another system, such as an analytics engine 106. Although FIG. 1 illustrates the resource-constrained sequential recommender system 108 as part of the analytics engine 106, the resource-constrained sequential recommender system 108 can be part of another system or part of a plurality of systems.

The analytics engine 106 can collect analytics data associated with various services, such as services provided to the users 116a-116n of the client devices 112a-112n. For example, the analytics engine 106 can collect, from the server(s) 104, data regarding capacity limitations of points of interest. Additionally, the analytics engine 106 can collect analytics data related to a user's history of interactions with one or more points of interest, such as which points of interest a user has visited and the sequence of points of interest visited. The analytics engine 106 collects the analytics data in a variety of ways. For example, in one or more embodiments, the analytics engine causes the server(s) 104 and/or third-party server to track user data (e.g., user behavioral data) and report the tracked user data for storage on the analytics database 110. In one or more embodiments, the analytics engine 106 receives user data directly from the client devices 112a-112n via data stored on the client devices 112a-112n (e.g., browser cookies, cached memory), embedded computer code (e.g., tracking pixels), a user profile, or using various types of tracking techniques. Thus, the analytics engine 106 collects or otherwise receives various types of data, including data regarding interactions of the users 116a-116n with points of interest.

In one or more embodiments, the resource-constrained sequential recommender system 108 performs operations associated with recommending points of interest to users based on analytics data stored in one or more databases (e.g., the analytics database 110). It should be noted that, although the resource-constrained sequential recommender system 108 functions to cause the server(s) 104 to perform the operations that will be described, for the purpose of convenience and simplicity, the following discussion will describe the resource-constrained sequential recommender system 108 as performing the operations. For example, the resource-constrained sequential recommender system 108 builds a multi-agent recommender problem, the solution of which provides recommendations to the agents (i.e., users 116a-116n) based on their interests and subject to the constraints (i.e., capacity limitations) on the resources associated with the available points of interest. To obtain the solution of the multi-agent recommender problem, the resource-constrained sequential recommender system 108 solves a linear program, incorporating the resource constraints into the solution. By solving the linear program, the resource-constrained sequential recommender system 108 obtains a mix of recommendation policies for the users 116a-116n. By accounting for capacity limitations, the resource-constrained sequential recommender system 108 avoids the possibility of recommending a point of interest that is at full capacity and could not timely service one or more of the users 116a-116n.

By solving the linear program, the resource-constrained sequential recommender system 108 also obtains a set of costs incurred by each policy, which the system uses as an input to a planner algorithm to determine new set of policies for the users 116a-116n. In one or more embodiments, the resource-constrained sequential recommender system 108 solves the planner algorithm by extending Thompson sampling to the domain of constrained sequential recommendations in order to learn the user's type. In one or more alternative embodiments, the resource-constrained sequential recommender system 108 generates a MOMDP which combines all possible user types into a single model and generates one recommendation policy for all user types simultaneously. By accounting for the user's type, the resource-constrained sequential resource-constrained sequential recommender system 108 can provide recommendations that are likely to appease the user's interests.

In one or more embodiments, the server(s) 104 may manage, generate, receive, and transmit any type of data associated with recommending points of interest to users. For example, the server(s) 104 can receive data associated with user behavior in response to given recommendations. This behavioral data may be provided to the server(s) 104 directly by the users 116a-116n via client devices 112a-112n. For example, the users 116a-116n may select on option provided by a recommendation application 114 via client devices 112a-112n that the users intend to either follow or disregard the recommendation. Additionally, or alternatively, the server(s) 104 may obtain this data by tracking the behavior of the users 116a-116n with regards to a given recommendation. For example, the server(s) 104 may observe whether a user travels in accordance with a provided recommendation. If a user travels to a point of interest that is different than the one recommended, the resource-constrained sequential recommender system 108 may update its belief in the user's type.

In one or more embodiments, the analytics database 110 stores all analytics data relevant to recommending points of interest to users. For example, the analytics database 110 may store data regarding available user types. More particularly, the analytics database 110 may store data associating a user type with particular interests. Additionally, the analytics database 110 may store data associating the interests of a user type with available points of interest that appease those interests. Further, the analytics database 110 may store data regarding points of interest, such as the total capacity of the resources associated with each point of interest.

In one or more embodiments, the resource-constrained sequential recommender system 108 extracts analytics data from the analytics database 110 to determine which point of interest to recommend to a particular user. For example, the resource-constrained sequential recommender system 108 generate a policy for a particular user based on that user's type. Thus, the resource-constrained sequential recommender system 108 may extract, from the analytics database 110, user data that is informative of the user's type. Further, the resource-constrained sequential recommender system 108 may extract data that associates the user's type with particular interests as well as data indicative of which points of interest appease those interests. Therefore, the resource-constrained sequential recommender system 108 may recommend those points of interest to the user.

As illustrated in FIG. 1, the analytics database 110 may be embodied as a separate component; as such, it may communicate with the server(s) 104 through any suitable communications protocol. Though FIG. 1 illustrates the analytics database 110 configured to communicate with the server(s) 104 directly, one or more embodiments may configure the analytics database to communicate with the server(s) 104 through the network 102. Additionally, FIG. 1 illustrates the analytics database 110 as a separate component; however, the analytics database 110 may be integrated into another component, such as the server(s) 104.

In one or more embodiments, the client devices 112a-112n include a computing device that allows the users 116a-116n to receive recommendations and provides data associated with the users 116a-116n to the server(s) 104. For example, the client devices 112a-112n can include smartphones, tablets, desktop computers, laptop computers, or other electronic devices. The client devices 112a-112n can include one or more applications (e.g., recommendation application 114) that allows the users 116a-116n to receive recommendations. For example, the recommendation application 114 can include a software application installed on the client devices 112a-112n. Additionally, or alternatively, the recommendation application 114 can include a software application hosted on the server(s) 104, which may be accessed by the client devices 112a-112n through another application, such as a web browser.

The following discussion will provide greater detail about the resource-constrained sequential recommender system 108 in the context of amusement parks. However, one of ordinary skill in the art will appreciate that the application of the resource-constrained sequential recommender system 108 is not limited to such a context. Rather, the applicability of the recommendation system is very broad. For example, in one or more embodiments, the resource-constrained sequential recommender system 108 may be used to recommend points of interest (e.g., monuments, restaurants, museums, parks, etc.) to a user visiting a city. Additionally, the resource-constrained sequential recommender system 108 may be used to recommend tutorial segments to a user of an online tutorial service, websites to visit, digital ads to serve to a user, digital content items to surface to a user, etc.

Figure 2:
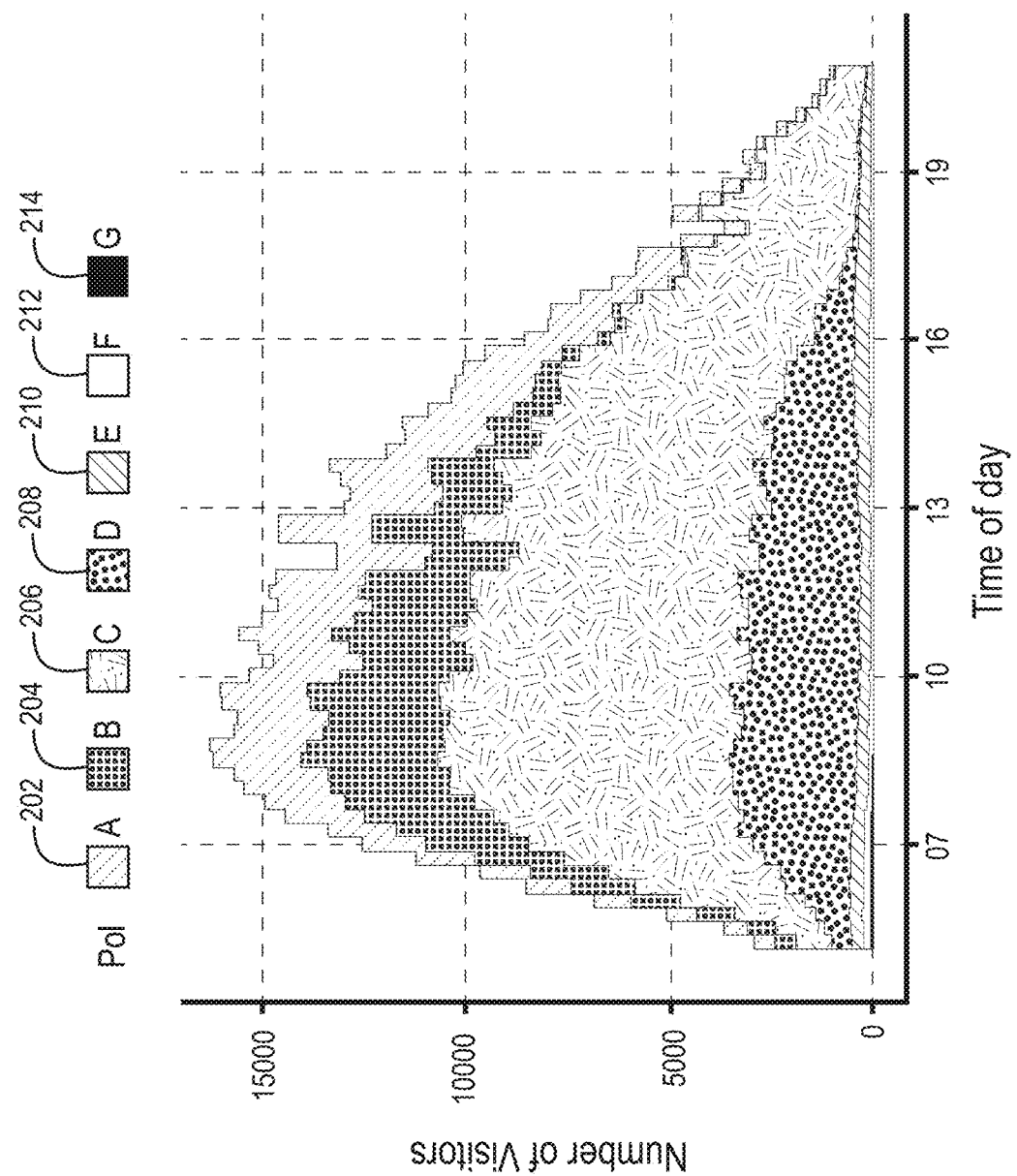
FIG. 2 illustrates a graph providing example data of users visiting various points of interest in accordance with one or more embodiments.

FIG. 2 illustrates a graph of example data of visitors to an amusement park serviced by various of the park's points of interest (i.e., attractions) during the course of one operating day. In particular, FIG. 2 illustrates the problems faced by a structure providing several points of interest in the context of an amusement park providing various attractions. The graph shown in FIG. 2 is made from approximately 65,000 data points of real data taken at a theme park as visitors visited different attractions (e.g., rides, restaurants, etc.). FIG. 2 represents each attraction (labeled "POI") as a distinct line on the graph, showing the number of visitors present at the attraction at a given time. As can be seen in FIG. 2, the observed attractions generally experienced a peak number of visitors sometime between 7 a.m. and 10 a.m. As will be discussed with reference to FIG. 3, a large influx of visitors into the park just prior to this time contributed significantly to the peak number of visitors at each attraction.

FIG. 2 additionally shows that each attraction may experience a substantially different number of visitors compared to the other attractions at any given time. For example, the graph shows that POI_A 202, POI_B 204, and POI_C 206 each experienced a much larger number of visitors at every observed time interval compared to POI_D 208, POI_E 210, POI_F 212, and POI_G 214. One or more factors may contribute to the different number of visitors experienced by each attraction. In particular, the number of visitors experienced by each attraction may be caused by one or more of the popularity of that attraction, the accessibility of that attraction, the total capacity at which that attraction can operate, or any other relevant factor. For example, POI_A 202 may be the most popular attraction at the theme park or an entirely new attraction. Alternatively, or additionally, POI_A 202 may be the most accessible attraction (e.g., closest to the park entrance or easiest to find). By contrast, POI_G 214 may be the least popular attraction or the attraction that is least accessible to visitors.

The graph of FIG. 2 illustrates problems faced by the amusement park and potentially any structure providing points of interest. Broadly speaking, as more users try to access the services provided by a particular point of interest, queues will build and the point of interest risks providing inefficient service to those users at the back of the queue. For example, if a large number of visitors at an amusement park visit the same attraction simultaneously, waiting lines will accumulate and the visitors at the back of the waiting line will experience longer wait times before being served by that attraction. To illustrate, the graph of FIG. 2 shows that POI_A 202 experienced a peak number of over fifteen thousand visitors, which likely caused a large waiting line to accumulate at the attraction. Consequently, those visitors who arrived later had to wait longer before being served by the attraction.

Further, if a point of interest attempts to operate beyond its capacity, then the point of interest will serve users inefficiently (e.g., below a predetermined level of acceptable efficiency). For example, an attraction at an amusement park may be built to serve a group of users at a predetermined rate. Specifically, the attraction may be built to serve users within a predetermined maximum acceptable service time. In other words, the attraction may have enough capacity (e.g., carts for a ride, tables at a restaurant, etc.) so that a user waiting for service does not have to wait longer than a determined acceptable wait time. However, if a number of users exceeding the attraction's operation capacity are present at the attraction simultaneously, the attraction will begin operating inefficiently (e.g., at least some of the users will have to wait for service beyond the determined acceptable wait time). For example, if the capacity of POI_A 202 is insufficient to serve the over fifteen thousand visitors who are visiting the attraction simultaneously during the peak interval, then POI_A 202 will begin to operate inefficiently and many visitors will have to wait longer than is deemed acceptable to receive service.

Additionally, FIG. 2 illustrates a characteristic of many structures that provide various points of interest. In particular, FIG. 2 shows that different points of interest may experience vastly different numbers of visitors at a given time, creating a difference in the capabilities of each point of interest to serve the current demands placed upon them by the users. For example, POI_A 202 experienced a peak number of over fifteen thousand visitors. As discussed above, unless POI_A 202 has the capacity to efficiently serve fifteen thousand visitors, the attraction will operate inefficiently. In contrast, POI_G 214 experienced the lowest number of visitors, having well below one thousand visitors present at the attraction at any time throughout the day, including the time at which POI_A 202 peaked. Therefore, while it is likely that POI_A 202 was operating beyond capacity at the time of its peak, it is likely that POI_G 214 had available capacity to serve more visitors. Thus, some attractions may needlessly operate inefficiently as other attractions may be capable of serving the excess of visitors waiting for service.

Further, the different number of visitors experienced by the various points of interest illustrate that some visitors have little to no interest in some of the points of interest. For example, the large number of visitors present at POI_A 202 at any given time shows that there were many visitors interested in that attraction while the low number of visitors at POI_G 214 shows that there were relatively fewer visitors interested in that attraction. Consequently, many visitors who visited POI_A 202 at some time throughout the day never visited POI_G 214 because it did not appease their interests. Therefore, when attempting to divert visitors from POI_A 202 to other attractions to avoid having POI_A 202 operate beyond its capacity, the resource-constrained sequential recommender system 108 takes into account each visitor's interests to make an effective recommendation. In other words, recommending that visitors—who intend to visit POI_A 202 during a time when POI_A 202 is at or near operating capacity—visit POI_G 214 instead, may not effectively divert visitors away from POI_A 202 if POI_G 214 does not appease their interests. Accordingly, by making recommendations based on a user's interests, the resource-constrained sequential recommender system 108 not only engages the user more effectively, but more successfully distributes users among the available points of interest to avoid causing any of the points of interests to operate beyond their respective capacities.

Figure 3:
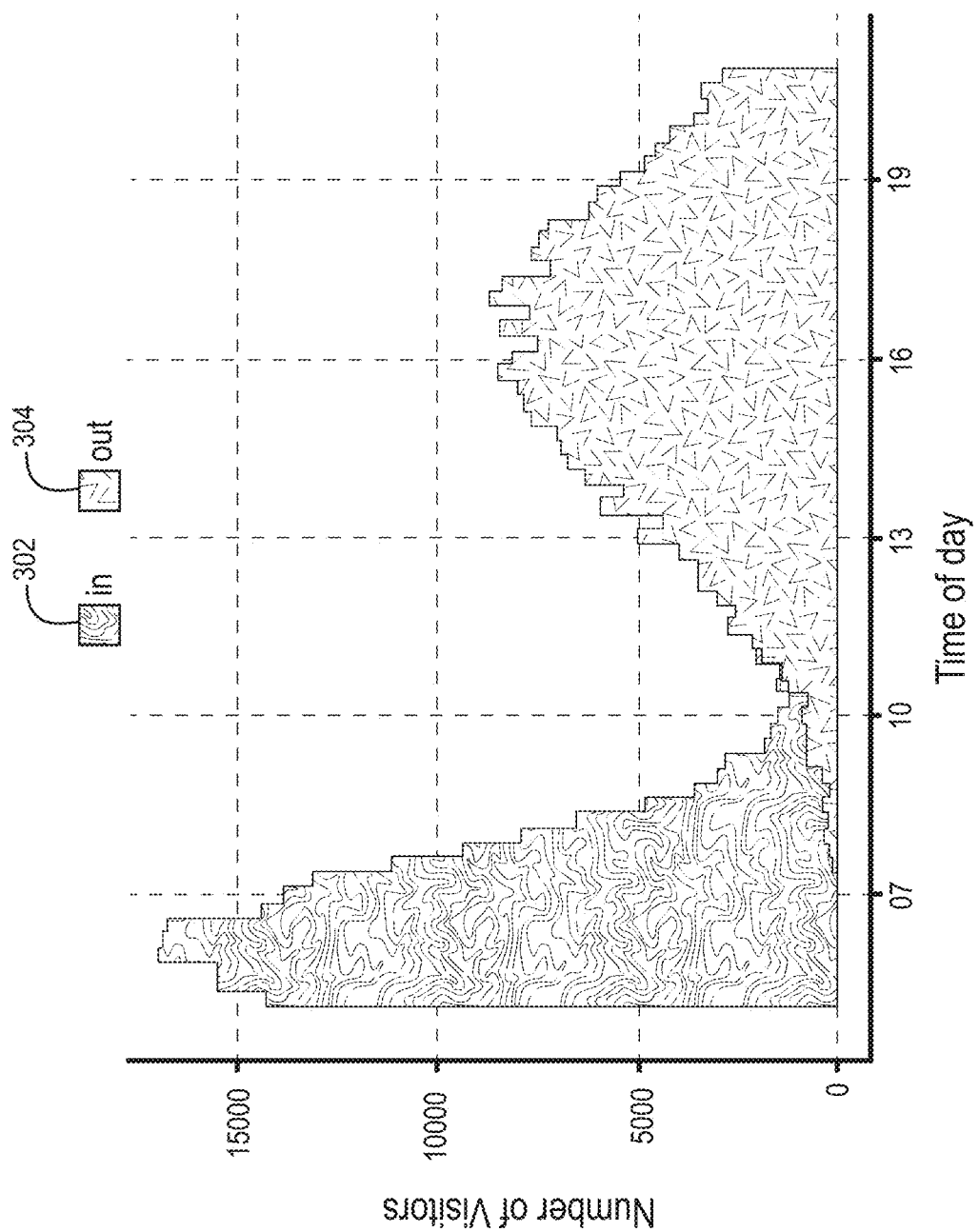
FIG. 3 illustrates a graph providing example data representing population dynamics in accordance with one or more embodiments.

FIG. 3 illustrates a graph of example data of visitors entering and exiting an amusement park throughout one day of operation. Specifically, the graph of FIG. 3 comprises data taken at the same theme park as was the data making up the graph of FIG. 2. In the context of amusement parks, FIG. 3 shows how visitors entering or exiting the park throughout the day may add to or detract from, respectively, the number of visitors present at an attraction at a given point in time. In particular, the line 302 represents visitors entering the park and line 304 represents visitors exiting the park. Line 302 of FIG. 3 shows that the majority of visitors entered the park before 10:00 a.m. Similarly, line 304 shows that visitors did not begin leaving the park in significant numbers until after 10:00 a.m. These trends illustrate why the majority of the attractions represented in FIG. 2 received a peak number of visitors between 7:00-10:00 a.m. Generally speaking, as the number of visitors present in the park grows, the number of visitors accessing each attraction will likely increase.

Broadly speaking, the graph of FIG. 3 exemplifies how population dynamics experienced by a structure affect the number of users accessing various points of interest provided by that structure. It should be noted that the trends of users entering and leaving may differ depending on one or more factors, such as the structure, the type of structure, the day of the week, the time of day, etc.; however, every structure must deal with changes in the number of users it must accommodate. In particular, as users enter a structure—whether it's a physical structure (e.g., an amusement park) or a non-physical structure (e.g., an online tutorial system hosted by one or more servers)—the resource-constrained sequential recommender system 108 must account for these new users and how they will interact with the various points of interest offered by the structure subject to the capacity limitations of the resources associated with those points of interest. As more users enter a structure (and are not balanced by at least an equal number of users leaving the structure), more users will be accessing each point of interest at a given time and one or more those points of interest experience a greater risk of operating beyond their capacity. By tracking the arrival and departure of users and updating its models to reflect those changes, the resource-constrained sequential recommender system remains current on the number of users present within the structure and may determine how that current number of users should be served by the available points of interest subject to the capacity limitations of their resources.

To provide recommendations to the users within a structure without causing a particular point of interest to operate beyond its capacity, the resource-constrained sequential recommender system 108 computes recommendation policies for all of the users simultaneously, taking into account the users that will be arriving at or departing from the structure as it does so. Further, to provide the users with recommendations that will appease those user's particular interests and successfully limit the number of users accessing a point of interest at a given time, the resource-constrained sequential recommender system 108 computes recommendation policies based on the types of those users.

To perform the above, the resource-constrained sequential recommender system 108 develops a multi-agent, constrained, partially observable planning problem where the type of the user type is hidden, and the constraints relate to the capacity limitations of the resources associated with the points of interest. In particular, the resource-constrained sequential recommender system 108 builds a CPOMDP defined over multiple agents to model the planning problem. By solving the CPOMDP, the resource-constrained sequential recommender system obtains a recommendation strategy for each user given a belief over the user's hidden type.

In general, an MDP is defined by the tuple $\{S, A, T, R, h\}$ where S represents a finite set of states, A represents a finite set of actions, T represents the transition function, R represents the reward function defined over these sets, and h represents the finite horizon (i.e., the number of time steps that recommendations should be computed for, which should be set according to the time the user is expected to be within the structure). In particular, a MDP may model the state transitions of one user or of many users. For example, at every time step t, a user chooses an action $a \in A$, after which the system transitions from state $s \in S$ to subsequent state $s' \in S$. The uncertainty in this transition is captured by the transition function $T: S \times A \times S \rightarrow [0, 1]$, which gives the probability of advancing to the next state as $T(s, a, s') = P(s'|s, a)$. The choice of action a in state s is valued through the instantaneous reward function $R: S \times A \rightarrow \mathbb{R}$. Solving the MDP provides a policy $\pi: \{1, \ldots, h\} \times S \rightarrow A$, which prescribes the action to take in each <time, state>-pair over the entire operating horizon. The expected value of a policy is given by the value function $$V_\pi(t,s) = R(s,\pi(t,s)) + \Sigma_{s' \in S}(T(s,\pi(t,s),s')V_\pi(t+1,s')) \quad (1)$$

The optimal policy $\pi^*$ (i.e., the policy which obtains the maximum expected value over the entire operating horizon) may be computed through an application of dynamic programming over the time dimension, computing the value function at time t on the basis of the values at t+1 by selecting the value maximizing action in each state as follows:

$$V_\pi^*(h,s) = \max_{a \in A} R(s,a)$$

$$V_\pi^*(t,s) = \max_{a \in A}(R(s,a) + \Sigma_{s' \in S}(T(s,a,s')V_\pi^*(t+1,s'))) \quad (2)$$

When the state of the MDP can only be observed indirectly, the planning problem becomes a Partially Observable MDP (hereinafter referred to as "POMDP"). A finite horizon POMDP consists of the tuple $\{S, A, O, T, R, \Omega, h\}$, which adds a finite set of observations $o \in O$ and an observation function $\Omega = P(o|a, s')$ that emits an observation based on the action and the unobserved state. Because the state is unobserved, a decision maker must choose actions based only on these current and past observations.

Because the state is not observed directly, the POMDP model may reason about a belief state b, which represents a probability distribution over the possible states S, with b(s) indicating how likely an agent is to be in state s. Given a belief state b, the action taken a, and the observation received o, the subsequent belief state b'('s) can be derived using application of Bayes' theorem. For a finite horizon POMDP, the number of reachable belief states B is also finite, as (in the worst case) they form a tree of depth h with a branching factor of |A||O| at each node. This belief-state tree can be used as the state space of a belief-state MDP that is equivalent to the POMDP.

Multi-agent MDPs model systems consisting of multiple cooperative users that can be collectively modeled as one MDP. In this model, each user is responsible for choosing an action $a_i$ according to its individual policy $\pi_i(t, s)$ defined over the system state s. These actions are combined into a joint action a for the state transition and instantaneous reward. Generally, the optimal policy for each user can be computed separately from the other users. However, when the users must choose actions to jointly satisfy constraints, the policies must be determined jointly.

A constrained MDP applies a number of linear constraints to the general MDP model. When applied to a multi-agent MDP, the global resource constraints force the users to coordinate their decisions, as the joint policy used by the users should maximize their total expected value while collectively staying below the global resource limits. The constraints may be modeled through a consumption function C and a limit function L defined over m resource types. For each user i, the consumption of resource type r is defined using function $C_{i,r}: S_i \times A_i \rightarrow [0, c_{max, i, r}]$ where $c_{max, i, r}$ denotes the maximum potential consumption of resource type r by user i. The limit function L(r) gives the maximum permitted instantaneous use of resource r when summed over all agents. Consequently, a resource violation occurs if the users collectively use more units of a resource than are available. Accordingly, joint policy $\pi$ violates the resource constraint for type r in joint states at time t if $$\Sigma_{i=1}^n C_{i,r}(s_i,\pi_i(t,s_i)) > L(r) \quad (3)$$

Additionally, the CPOMDP models the sequential nature of the planning problem. In general, by accounting for the sequential history of the user's actions, the resource-constrained sequential recommender system 108 can use context to improve the recommendations to the user. In particular, the resource-constrained sequential recommender system 108 can improve its recommendations by avoiding recommending points of interest the user has already accessed. For example, given a finite set of points of interest $l \in P$ to be accessed one at a time, the resource-constrained sequential recommender system 108 recommends to the user the next point of interest to view. Although each user has its own goals in entering the structure providing the points of interest, the resource-constrained sequential recommender system 108 clusters visitor interests into a set of discrete user types $\theta \in \Theta$. Each type $\theta$ defines a valuation over the items, awarding value according to a reward function $R_\theta(l)$ for seeing point of interest l.

From the perspective of the resource-constrained sequential recommender system 108, the interactions that a user makes results in a history of user actions. For example, if a user accesses point of interest $l_i$ and then accesses $l_j$, the user has a history of $\{\ldots, l_i, l_j\}$. Such a history may be summarized in a higher level 'context state' $s_k$. Given a current context, the resource-constrained sequential recommender system 108 assumes the next point of interest user of type $\theta$ will access can be modeled by a probability distribution over the points of interest $P(l|s_k, \theta)$. Additionally, the resource-constrained sequential recommender system assumes that users boost their probability of accessing a recommended point of interest in accordance with a type specific propensity to listen $\mu(\theta)$.

To build the CPOMDP, the resource-constrained sequential recommender system 108 merges two specifications of MDPs. In particular, the resource-constrained sequential recommender system 108 merges the Parametric MDP and the Constrained Multi-agent MDP, which provides the CPOMDP the properties of both. In particular, the Parametric MDP provides the properties of a finite planning horizon $\{1, \ldots, h\}$, a finite set of types $\theta \in \Theta$, a finite set of states $s \in S_\theta$, a finite set of actions $a \in A_\theta$, the transition function $T_\theta(t, s, a, s')=Pr(s'|t, s, a, \theta)$ and the reward function $R_\theta(t, s, a) \to \mathbb{R}$. Additionally, the Constrained Multi-agent MDP provides the properties of a finite number of users $\{1, 2, \ldots, n\}$, a finite set of resources $r \in \rho$, the resource consumption function $C(r, t, s, a) \in \{0, 1\}$, and the resource limit $L(r, t) \in \mathbb{N}_+$.

In one or more embodiments, when the resource-constrained sequential recommender system 108 builds the CPOMDP, the resource-constrained sequential recommender system 108 begins with a collection of passive data. In particular, the resource-constrained sequential recommender system 108 collects passive data through observation before it has built the CPOMDP. In one or more embodiments, the resource-constrained sequential recommender system 108 stores the passive data within one or more databases and accesses those databases to extract the passive data when it is ready to build the model. In one or more embodiments, the passive data comprises data about the user. For example, the passive data may comprise data the resource-constrained sequential recommender system 108 obtained during a prior time at which the user entered the structure or during the time after the user is currently within the structure but before the resource-constrained sequential recommender system 108 has built the CPOMDP. In one or more embodiments, user data includes points of interest the user has already accessed and the times at which the user accessed those points of interest. Additionally, or alternatively, the passive data may include data about the structure itself (e.g., available points of interest, the resources associated with the points of interest, and the capacity limitations on those resources).

With the passive data, the resource-constrained sequential recommender system 108 builds a Parametric MDP. In one or more embodiments, the resource-constrained sequential recommender system 108 uses passive data containing {user, location, timestamp} triples to build a Parametric MDP by fitting a Probabilistic Suffix Tree to the data and augmenting the model with recommendation actions parametrized by the user's propensity to listen. In particular, in one or more embodiments, the resource-constrained sequential recommender system 108 employs a 'take-it-or-leave-it" model in which the system issues, at most, a single recommendation at a time. In some embodiments, the resource-constrained sequential recommender system 108 employs an 'alternatives' model in which the system can issue, at most, two recommendations at a time (i.e., a dual recommendation). In some embodiments, whether the resource-constrained sequential recommender system 108 issues single or dual recommendations, the set of potential recommendation actions A includes a 'no recommendation' action $a_0$ in which the user is not given a recommendation, and a recommendation action $a_i$ for each point of interest $l_i$. Where the resource-constrained sequential recommender system 108 issues a dual recommendation, the set of potential recommendation actions A can also include dual recommendation actions $a_{i,j}$ recommending the user select either point of interest $l_i$ or $l_j$. In one or more embodiments where the resource-constrained sequential recommender system issues a dual recommendation, the user can behave as if the user received a recommendation for the more valued of the two, thus building the Parametric MDP from the Probabilistic Suffix Tree results in the following transition functions (where z is a normalizing factor that ensures T remains a probability distribution):

$$T_\theta(s'|s,a_0)=T_\theta(s'|s)$$

$$T_\theta(s'|s, a_i) = \begin{cases} T_\theta(s'|s, a_0)^{1/\mu(\theta)} & \text{if } l_i \text{ selected in } s' \\ T_\theta(s'|s, a_0)/z & \text{otherwise} \end{cases} \quad (4)$$

$$T_\theta(s'|s, a_{i,j}) = \begin{cases} T_\theta(s'|s, a_i) & \text{if } R_\theta(l_i) \geq R_\theta(l_j) \\ T_\theta(s'|s, a_j) & \text{otherwise} \end{cases}$$

In one or more embodiments, the resource-constrained sequential recommender system 108 further modifies the transition function of the constructed Parametric MDP to include population dynamics. In particular, the resource-constrained sequential recommender system 108 modifies the transition function with a probability of arriving in the system, Pr(in |t), as well as a probability of departing the system once inside, Pr(out| in, t). These probabilities can be fit from the data exemplified by the graph of FIG. 3 by looking at the frequency with which people have been recorded at various points in time. Additionally, the resource-constrained sequential recommender system 108 adds two special states to the MDP: $s_{init}=e$ (where e is the root of the PST) and $S_{final}$. The resulting transition functions are as follows:

$$Pr(s_{init}|t,s_{init})=1-Pr(\text{in }|t)$$

$$Pr(s't,s_{init})=Pr(\text{in }|t)Pr_{PST}(s'|e)$$

$$Pr(s_{final}|t,s)=Pr(\text{out}|t)s \neq s_{init} \quad (5)$$

$$Pr(s'|t,s)=(1-Pr(\text{out}|t))(Pr_{MDP}(s'|t,s))$$

$$Pr(s_{final}|s_{final})=1 \quad (5)$$

The first line of equation 5 provides the probability that the user who has not yet entered the structure, will remain outside the structure during the time step. The second line of the equation provides the probability that the user will proceed to state s' for the subsequent time step when the user is currently outside of the structure during the prior time step. This probability is the product of the probability that the user enters the structure and the probability that state s' is accessible from the root of the PST. The third line of equation 5 provides the probability that a user will depart from the structure. As can be seen from the third line, the user must currently be in the structure in order to eventually leave it. The fourth line of the equation provides the probability that the user will proceed to state s' when the user is already in the structure. This probability is the product of the probability that the user will not be leaving the structure and the typical MDP transition function probability that the user will proceed to state s'. And the fifth line of equation 5 provides the probability of staying in the final state once the user has proceeded to the final state. This probability is set equal to a value of 1 and represents that a user cannot re-enter the structure once the user has chosen to depart.

After merging the Parametric MDP and the Constrained Multi-Agent MDP, the resource-constrained sequential recommender system 108 uses column generation to solve the resulting CPOMDP. As mentioned above, solving the CPOMDP provides a recommendation strategy for a user given a belief over its hidden type. In particular, by defining the CPOMDP over multiple agents and solving, the resource-constrained sequential recommender system obtains an optimal joint policy that provides an optimal mix of policies for every user within the structure where each policy is based on the respective user's type. And by using column generation, the resource-constrained sequential recommender system 108 can solve the CPOMDP in light of the capacity limitations of the resources associated with the available points of interest.

Through column generation, the resource-constrained sequential recommender system 108 employs a linear program which provides the optimal mix of policies for each user. The linear program is the master side algorithm of the column generation procedure. In particular, the linear program is a type of optimization problem specifying an objective function and a set of constraints. Where $Z_i$ represents a set of policies for each user i, the expected value of the set of policies is represented by $V_{i,\pi_i}$, and $C_{i,\pi_i}$ represents the expected consumption of policy $\pi_i$, the linear program is defined as follows:

$$\max_{x_{i,\pi_i}} \sum_{i=1}^{n} \sum_{\pi_i \in Z_i} V_{i,\pi_i} \cdot x_{i,\pi_i} \quad (6)$$

$$\text{s.t.} \sum_{i=1}^{n} \sum_{\pi_i \in Z_i} C_{i,\pi_i}^{r,t} \cdot x_{i,\pi_i} \leq L(r,t) \quad \forall r, t$$

$$\sum_{\pi_i \in Z_i} x_{i,\pi_i} = 1 \quad \forall i$$

$$x_{i,\pi_i} \geq 0 \quad \forall i, \pi_i$$

The first line of equation six is the maximizing operation. The operation sums together the value of using a particular policy for a particular user multiplied by some variable x. By solving the linear program, the resource-constrained sequential recommender system 108 assigns a value to the variable x, which provides the probability of choosing the particular policy for the particular user. The second line of the equation provides the constraints set on the resulting mix of policies. In particular, through the second line of this equation, the resource-constrained sequential recommender system 108 bars the mix of policies from recommending points of interests to more users than capacity limits of their associated resources could serve. In one or more embodiments, the capacity limits may change in time (e.g., resources may be added to or taken away from a point of interest). For example, an amusement park may add additional cars to one of its rollercoaster's trains, thereby increasing the rollercoaster's capacity limitations and allowing the attraction to serve users at a faster rate. In one or more alternative embodiments, the capacity limits remain unchanged in time. The third line of equation 6 provides the condition that the variable x is a probability distribution. In particular, this line provides the condition that the probability of choosing one of the recommendation policies from the set of recommendation policies is equal to 1, meaning that the resource-constrained sequential recommender system 108 may not choose a recommendation policy that is not already part of the set of available policies. The fourth line of equation 6 provides the condition that there cannot be a negative probability of choosing a particular policy.

In one or more embodiments, resource-constrained sequential recommender system 108 may solve the linear program using any off-the-shelf linear program solver. For example, in one or more embodiments, the resource-constrained sequential recommender system 108 solves the linear program using Gurobi. Alternatively, the resource-constrained sequential recommender system 108 may use other standard toolboxes, such as MATLAB or IBM ILOG CPLEX. By solving the linear program, the resource-constrained sequential recommender system 108 assigns probability values to the variable x and also obtains dual costs $\lambda_{r,t}$ for each resource-time pair. The dual costs specify, per constraint, the value that needs to be overcome in order to improve the overall solution value. Looked at differently, the resource-constrained sequential recommender system 108 uses the dual costs to determine how much more value would be obtained if there was at least one more unit of a particular resource available.

The resource-constrained sequential recommender system 108 then inputs the dual costs obtained from the solution of the linear program into a planner algorithm, which determines a new optimized set of sequential recommendations (e.g., a new recommendation policy per user). In one or more embodiments, the resource-constrained sequential recommender system 108 augments equation 2 to incorporate the dual costs as follows:

$$V(t,s) = \max_{a \in A}(R(t,s,a) + \Sigma_{s' \in S}(T(t,s,a,s')V(t+1,s)) - \Sigma_{r \in \rho} \lambda_{r,t} C(r,t,s,a)) \quad (7)$$

The first term of equation 7 provides the instantaneous reward for taking action a at time t and while in current state s. The second term of the equation provides the sum of the future values in taking the action a. The third term describes the instantaneous cost of the consumption that will occur as a result of taking action a. In particular, $\lambda$ has some positive value if the associated point of interest is already operating at capacity. If the point of interest is not operating at capacity, $\lambda$=0. Additionally, if the recommendation to the point of interest did not result in consumption of its resources, C=0. When both C and $\lambda$ have some positive value, the variables indicate that resources have been consumed and that the consumption bears a cost. However, if the cost is still lower than the instantaneous and future rewards, the resource-constrained sequential recommender system 108 may determine that the recommendation still provides a net benefit and the recommendation may be provided to the user despite its costs.

After solving equation 7, the resource-constrained sequential recommender system 108 adds the new policies to the policy set $Z_i$ incorporated into the linear program (i.e., the new policies become a new column in the program). The resource-constrained sequential recommender system 108 repeats this process (i.e., solving the linear program to obtain an optimal mix of policies and an associated set of costs, inputting the costs into the planner algorithm, and solving the planning algorithm to obtain a new set of policies) until the costs converge. In other words, the resource-constrained sequential recommender system 108 repeats the process until the costs stop changing, because once the costs stop changing, solving the planning algorithm stops providing new policies. Therefore, by employing the column generation process, the resource-constrained sequential recommender system 108 converges to the optimal mix of policies for the group of users in the structure subject to the constraints.

Equation 7 may generally be used to solve for an MDP where the user's type is already known. However, in one or more embodiments, the resource-constrained sequential recommender system 108 operates in an environment where the user's type is unknown. Therefore, in one or more embodiments, the resource-constrained sequential recommender system 108 employs methods of solving equation 7 in a way that deals with the uncertainty regarding a user's type. In particular, the resource-constrained sequential recommender system 108 may employ methods of determining the user's type and its associated preferences and propensity to listen. In one or more embodiments, the resource-constrained sequential recommender system 108 extends Thompson sampling to the domain of multi-agent, constrained sequential recommendations as will be explained in more detail below with reference to FIG. 4. In one or more alternative embodiments, the resource-constrained sequential recommender system 108 employs a MOMDP approach to obtain an approximate solution as will be discussed in more detail below with reference to FIG. 5.

Figure 4:
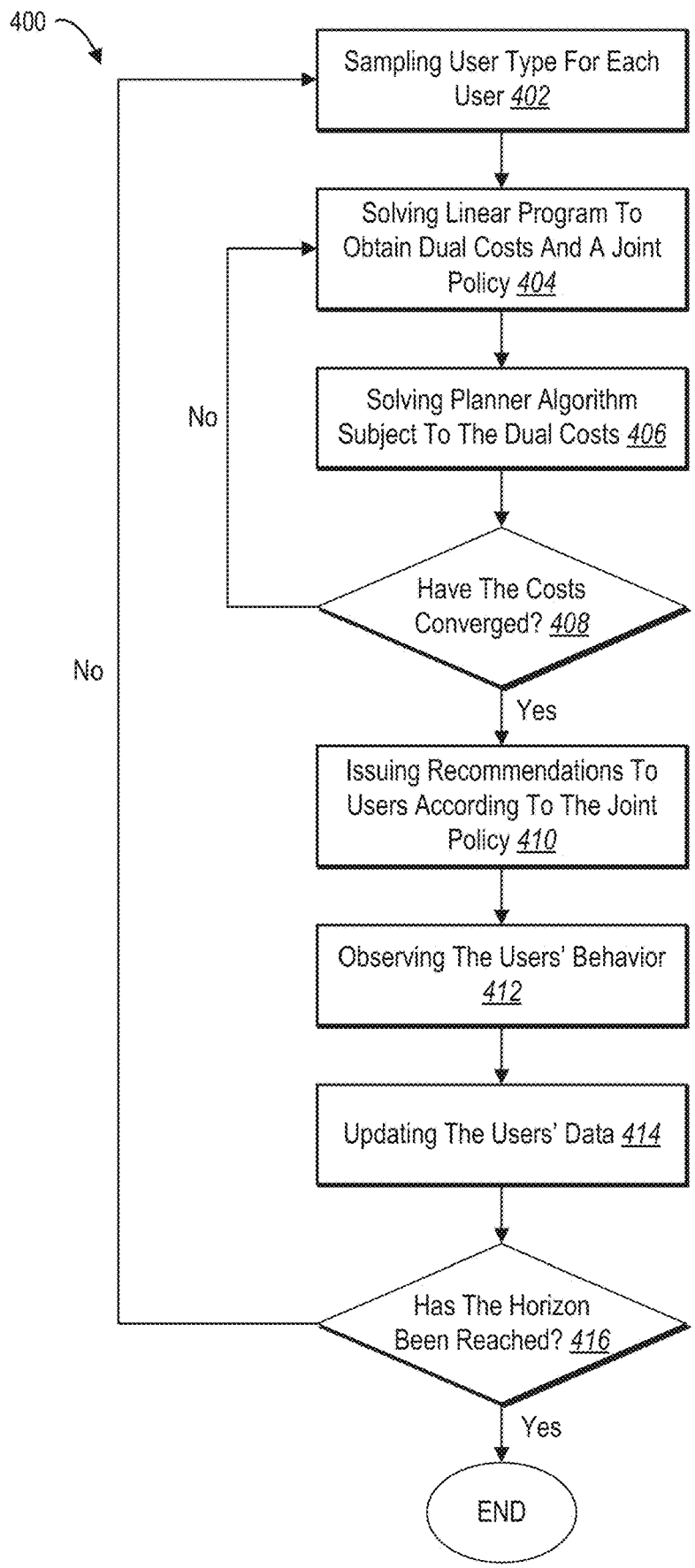
FIG. 4 illustrates a flowchart of a series of acts used to implement Thompson sampling to determine a user type in accordance with one or more embodiments.

FIG. 4 illustrates a series of acts 400 whereby the resource-constrained sequential recommender system 108 may implement Thompson sampling to track the types of the users and generate recommendation policies based on those types. In particular, through Thompson sampling, the resource-constrained sequential recommender system 108 makes an initial assumption about a user's type and then generates a recommendation policy based on that user's type. Based on the user's reaction to a recommendation from that policy, the resource-constrained sequential recommender system 108 may update the user's type. While FIG. 4 illustrates acts according to one embodiment, alternative embodiments may omit, add to, reorder, and/or modify any of the acts shown in FIG. 4.

The series of acts 400 includes an act 402 of sampling a user type for each user. In one or more embodiments, the resource-constrained sequential recommender system 108 maintains, for each user within the structure, a probability distribution over the possible types $b_i = \Pr(\theta)$ based on the knowledge the resource-constrained sequential recommender system 108 already has about the users (i.e., the prior). In particular, the resource-constrained sequential recommender system 108 collects passive data about the users and determines the probability distribution over the possible types for each of the users based on the passive data. The resource-constrained sequential recommender system 108 samples a type for the users from their respective probability distributions. In one or more embodiments, the resource-constrained sequential recommender system 108 randomly samples a user type for each user from their respective probability distribution. In some embodiments, the resource-constrained sequential recommender system 108 assumes the user type with the highest probability within the respective probability distributions to be type for each user.

The series of acts 400 also includes the act 404 of solving a linear program to obtain dual costs and a joint policy. In particular, the resource-constrained sequential recommender system 108 solves the linear program to obtain a joint policy in accordance with each user's sampled type. The linear program provided by equation 6, however, assumes that users have heterogeneous models, necessitating planning a recommendation policy for every user. However, because the resource-constrained sequential recommender system 108 provides recommendations based on a user type, the resource-constrained sequential recommender system 108 may limit itself to only computing 101 new policies. Their expectations are combined; however, because expected values are conditional on the current state s, the resource-constrained sequential recommender system 108 adds a column for every $(\theta, s)$ pair. Given set $S_{\theta_i}$ containing all different states attained by users sampled to be type $\theta_i$, and letting $n_{i,k}$ count the number of users currently in state $s_k \in S_{\theta_i}$, the linear program to solve is augmented and becomes:

$$\max_{x_{i,\pi_i,k}} \sum_{i=1}^{|\Theta|} \sum_{\pi_i \in Z_i} \sum_{s_k \in S_{\theta_i}} V_{\theta_i,\pi_i}(s_k) \cdot x_{i,\pi_i,k} \quad (8)$$

$$\text{s.t.} \sum_{i=1}^{|\Theta|} \sum_{\pi_i \in Z_i} \sum_{s_k \in S_{\theta_i}} C_{\theta_i,\pi_i}^{r,t}(s_k) \cdot x_{i,\pi_i,k} \leq L(r,t) \quad \forall\, r, t$$

$$\sum_{\pi_i \in Z_i} x_{i,\pi_i,k} = n_{i,k} \quad \forall\, i, k$$

$$x_{i,\pi_i,k} \geq 0 \quad \forall\, i, \pi_i, k$$

The series of acts 400 also includes the act 406 of solving the planner algorithm subject to the dual costs. In particular, the resource-constrained sequential recommender system 108 uses the cost-augmented planner algorithm provided in equation 7 to determine a new optimized recommendation policy per type of user.

The series of acts 400 further includes the act 408 whereby the resource-constrained sequential recommender system 108 determines whether the dual costs have converged. In particular, the dual costs have converged once the dual costs have stopped changing or are within a predetermined threshold. If the dual costs have not yet converged, the series of acts 400 returns to the act 404 of solving the linear program to obtain dual costs and a joint policy. In particular, the resource-constrained sequential recommender system 108 adds the policies obtained by solving the planner algorithm to the policy set $Z_i$ and solves the linear program again. When the resource-constrained sequential recommender system 108 determines that the dual costs have converged, the series of acts 400 proceeds to act 410.

As illustrated, the series of acts 400 also includes the act 410 of issuing recommendations to the users according to the joint policy. In particular, the resource-constrained sequential recommender system 108 issues recommendations to the users, using the joint policy obtained from solving the linear program when the dual costs have converged. In particular, the resource-constrained sequential recommender system 108 issues recommendations to users in accordance with policies that assume the users are of the type sampled. Therefore, the recommendation to a user may not be in accordance with that user's true type.

The series of acts 400 further includes the act 412 of observing the user's behavior. If the user follows the recommendation, then the resource-constrained sequential recommender system 108 reinforces its belief that the user is of the sampled type. For example, if the resource-constrained sequential recommender system 108 sampled a visitor of an amusement park to be of a type that enjoyed rollercoasters, recommended a rollercoaster to that user based on the sampled type, and observed the user proceed to follow the recommendation, then the resource-constrained sequential recommender system 108 reinforces its belief that the user is of the sampled type. However, if the user ignored the recommendation and proceeded to go to a children's attraction, the user may determine that the sampled type is wrong and needs to be changed (if the sampled type does not include interests in children's attractions).

As shown, the series of acts 400 also includes the act 414 of updating the users' data. As mentioned, the resource-constrained sequential recommender system 108 initially samples each user's type based on the knowledge the resource-constrained sequential recommender system 108 has already obtained regarding that user. In one or more embodiments, the resource-constrained sequential recommender system 108 obtains this user information as passive data. When updating the users' data, the resource-constrained sequential recommender system adds what it learned from observing each user's response to the recommendations provided to the data regarding that particular user. If the user followed the recommendation, the resource-constrained sequential recommender system 108 may add information reinforcing its belief that the user is of the particular type sampled. However, if the user ignored the recommendation, the resource-constrained sequential recommender system 108 may update the user's data to reflect this behavior, indicating that the user may actually be of a different type. In particular, when updating the user's data, the resource-constrained sequential recommender system 108 updates the probability distribution over the possible types $b_i$ using Bayes' Rule.

The series of acts 400 further includes act 416 whereby the resource-constrained sequential recommender system determines whether the horizon has been reached. If the horizon has been reached, the series of acts 400 proceeds to the act 420 whereby the series of acts 400 ends. If the horizon has not yet been reached, the series of acts 400 returns to the act 402 of sampling the user type for each user. In particular, the resource-constrained sequential recommender system 108 re-samples the user type based on the updated probability distribution over the possible types $b_i$. In particular, the method 400 continuously re-iterates after updating the probability distribution over the possible types $b_i$ for each user until the horizon has been reached. In this way, the probability distribution for a user's type may never reach 100%, but is improved with each iteration of the series of acts 400. Therefore, whenever the resource-constrained sequential recommender system 108 re-samples a user's type according to the probability distribution over the possible types $b_i$, the probability that the sampled type is the same as the user's true type improves. The types may eventually converge, allowing the resource-constrained sequential recommender system 108 to obtain a recommendation policy (by solving the linear program) in accordance with the user's true type. In one or more embodiments, the resource-constrained sequential recommender system 108 establishes a cutoff criterion that, if met, will end sampling of the user's type before the horizon is reached. For example, if the resource-constrained sequential recommender system 108 provides three recommendations to a user according to a sampling that indicates a user is of a certain type and the user follows all three recommendations, the resource-constrained sequential recommender system 108 may determine that the sampled type is at least "close enough" to the user's true type and stops resampling that user's type.

The acts and algorithms discussed above in relation to FIG. 4, in one or more embodiments, can comprise the corresponding structure for performing a step for determining recommendations for the plurality of users by taking into account user types, the plurality of resource constraints, the plurality of expected resource consumptions, the sequential history of user actions for each user of the plurality of users, and the current state of each user. In particular, the acts and algorithms of discussed above in relation to FIG. 4 can comprise the corresponding structure for performing a step for determining recommendations for the plurality of users by taking into account user types, the plurality of resource constraints, the plurality of expected resource consumptions, the sequential history of user actions for each user of the plurality of users, and the current state of each user using extended Thompson sampling.

The state diagram of FIG. 4 illustrates an embodiment of extended Thompson sampling that the resource-constrained sequential recommender system 108 can utilize to solve a CPOMDP in a multi-agent, constrained setting. Algorithm 1 presented below is another characterization of extended Thompson sampling that the resource-constrained sequential recommender system 108 can utilize to solve a CPOMDP in a multi-agent, constrained setting.

---

Algorithm 1

Given prior $\phi = P(\theta_j)$, epoch $\tau$, initial state $s_1$, true types $\hat{\theta}_i$
Set time $t \leftarrow 1$. Set state $s_i \leftarrow s_1$, belief $b_i \leftarrow \phi$ $\forall i$ 1:   for episode $k = 1 \rightarrow \frac{h}{\tau}$ do
2:     sample $\vec{\theta}_j \sim \vec{b}$
3:     plan $\langle x, Z \rangle = \text{COLGEN}(M(\vec{\theta}_j), n_{j,k})$ ▷ Alg 1 using LP (11)
4:     sample joint $\vec{\pi} \sim \langle x, Z \rangle$
5:     for timestep $l = 1 \rightarrow \tau$ do
6:       select joint action $\vec{a} = \vec{\pi}(t, \vec{s})$
7:       observe next state $s_i' \sim P(\bullet \mid \theta_j, s_i, a_i)$     $\forall i$
8:       update $b_i$ by Bayes' rule on $P(s_i' \mid \bullet, s_i, a_i)$     $\forall i$
9:       $\vec{s} \leftarrow \vec{s}'$, $t \leftarrow t + 1$
10:    end for
11: end for

---

As shown by line 3 of Algorithm 1, the resource-constrained sequential recommender system 108 can employ column generation. In particular, the resource-constrained sequential recommender system 108 can utilize the following column generation algorithm.

---

Column generation for CPOMDP M $\lambda = 0$, $\lambda' = \infty$
1:   while $\lambda \neq \lambda'$ do
2:     $\lambda \leftarrow \lambda'$
3:     $\pi_{new} \leftarrow \text{PLAN}(M, \lambda)$     ▷ Equation (7)
4:     $Z \leftarrow Z \cup \pi_{new}$
5:     $\langle x, \lambda' \rangle \leftarrow \text{solveLP}(Z)$     ▷ Equation (8)
6:   end while
7:   return $\langle x, Z \rangle$

---

While Algorithm 1 may appear to interleave a potentially expensive centralized planning step with the on-line execution of the policy, in practice the resource-constrained sequential recommender system 108 can execute warm restarts of the linear program shown in equation 7 by initializing the episode k linear program with the policies computed for episode k−1.

In one or more embodiments, Algorithm 1 can comprise the corresponding structure for performing a step for determining recommendations for the plurality of users by taking into account user types, the plurality of resource constraints, the plurality of expected resource consumptions, the sequential history of user actions for each user of the plurality of users, and the current state of each user. In particular, Algorithm 1 can comprise the corresponding structure for performing a step for determining recommendations for the plurality of users by taking into account user types, the plurality of resource constraints, the plurality of expected resource consumptions, the sequential history of user actions for each user of the plurality of users, and the current state of each user using extended Thompson sampling.

The resource-constrained sequential recommender system 108 takes risks when using Thompson sampling. In particular, by providing recommendations to a user under the assumption that the user is of type $\theta_1$, when the user's true type is $\theta_2$, the user may provide recommendations that are very poor for $\theta_2$. Especially early on, before the types have converged sufficiently, the resource-constrained sequential recommender system 108 can ignore other actions that are more informative with respect to the updating the user information. Further, the resource-constrained sequential recommender system 108 risks disengagement by the user before a good match is made by determining that the user is truly of type $\theta_2$. The resource-constrained sequential recommender system 108 can address these potential pitfalls by using a novel algorithm with a bounded approximation error for problems with these properties.

In particular, in one or more embodiments, the resource-constrained sequential recommender system 108 implements a MOMDP to keep track of the user's type. As mentioned before, the resource-constrained sequential recommender system 108 generates recommendation policies based on a user type; therefore, the resource-constrained sequential recommender system 108 models each user type as a distinct MDP. To generate a MOMDP, the resource-constrained sequential recommender system 108 combines each typed MDP into a single model that keeps track of a belief over which type the user might belong to. In general, models with mixed observability have states which can be factored into a partially observable factor and a fully observable factor. The unobserved factor is that for each user, their type is initially unknown, except for the prior over the possible types. The resource-constrained sequential recommender system 108 exploits this by merging the typed MDPs, resulting in factored states for which each observation uniquely identifies the MDP state (i.e., the type). The resource-constrained sequential recommender system 108 may then employ MOMDP solvers that are able to use this factored state space to reduce the dimensionality of the value function, thereby reducing the solve time by orders of magnitude, alleviating the risk of disengagement.

In one or more embodiments, the resource-constrained sequential recommender system 108 generates a single MOMDP that provides the properties of a finite planning horizon $\{1, \ldots, h\}$, a finite number of agents $\{1, \ldots n\}$, a finite set of types $\theta \in \Theta$, a finite set of states $s \in S$, a finite set of observations $o \in O = S$, a finite set of actions $a \in A$, a finite set of resources $r \in \rho$, and observable transition function $T_x(t, s, \theta, a, s') = \Pr(s'|t, s, a, \theta)$, a latent transition function $T_y(\theta, \theta')=1$ iff $\theta=\theta'$, an observation function $O(o, s', \theta, a)=1$ iff $o=s'$, a reward function $R(t, s, \theta, a) \to \mathbb{R}$, a resource consumption function $C(r, t, s, \theta, a) \in \{0, 1\}$, and a resource limit $L(r,t) \in \mathbb{N}_+$. By generating the single MOMDP, the resource-constrained sequential recommender system 108 may compute one recommendation policy for all identified user types simultaneously. In one or more embodiments, the resource-constrained sequential recommender system 108 employs solvers, such as QMDP or SARSOP, augmented for inclusion of costs. In one or more alternative embodiments, the resource-constrained sequential recommender system 108 solves the MOMDP using a bounded belief tree.

Figure 5:
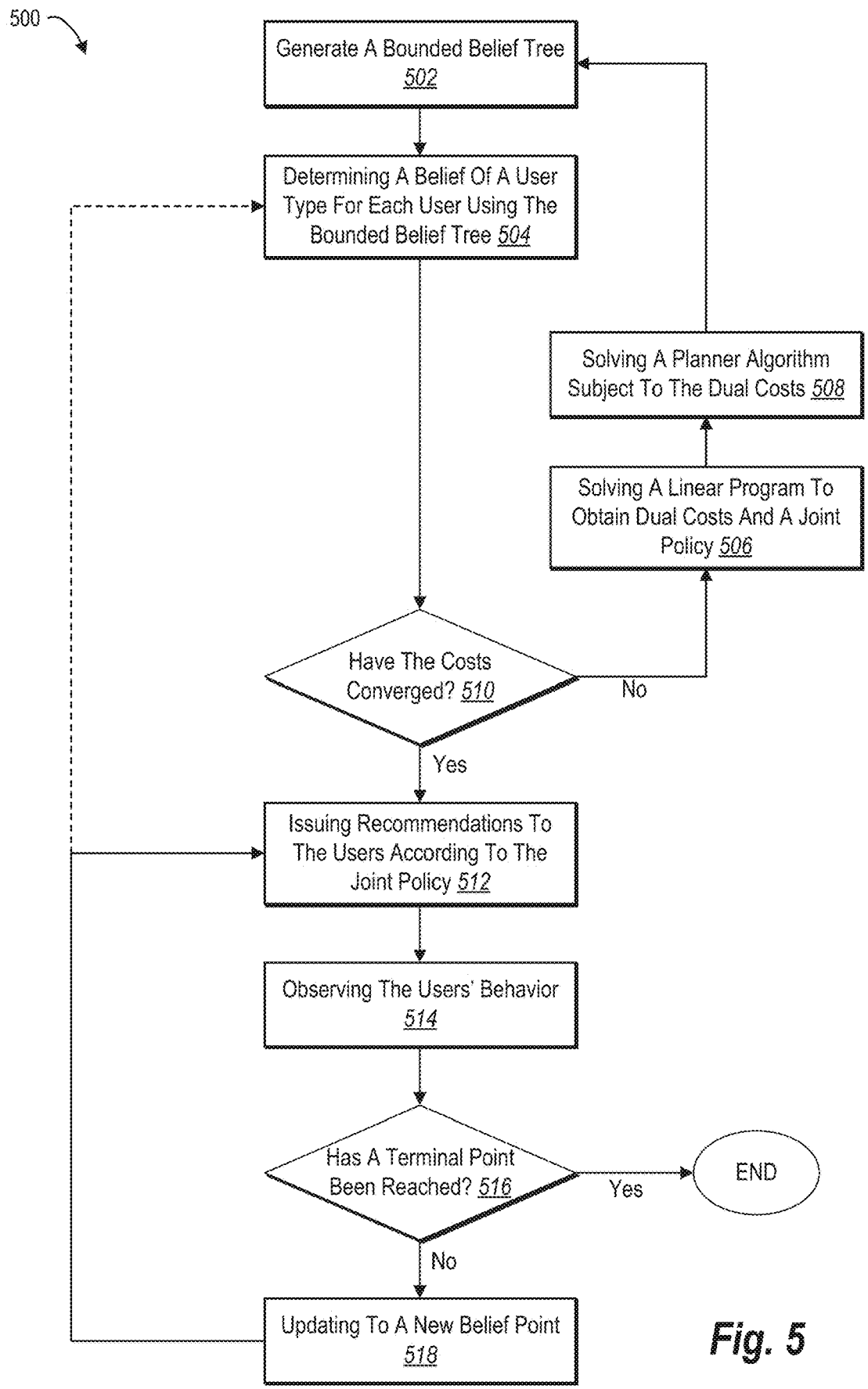
FIG. 5 illustrates a flowchart of a series of acts used to implement a bounded belief tree to approximate a user type in accordance with one or more embodiments.

FIG. 5 illustrates a series of acts 500 whereby the resource-constrained sequential recommender system 108 can implement a bounded belief tree to approximate the types of the users within the structure and generate recommendation policies based on those approximate types. While FIG. 5 illustrates acts according to one embodiment, alternative embodiments may omit, add to, reorder, and/or modify any of the acts shown in FIG. 5.

The series of acts 500 includes the act 502 of generating a bounded belief tree. Generally, generating a belief tree involves generating a tree having a finite number of reachable belief points B. In particular, starting from the root of the tree, each subsequent belief point represents a subsequent time step so that exhaustively generating belief points for all times steps results in a tree having a depth of h (i.e., the depth of the tree is equal to the horizon h) Further, each node of the tree has a branching factor A|O|. Consequently, generating a belief tree exhaustively through the horizon h results in an exponentially large B. Thus, obtaining an optimal policy using an exhaustively generated belief tree can become difficult. Therefore, to manage the model more efficiently, the resource-constrained sequential recommender system 108 bounds the expansion of B to limit its size. In particular, the resource-constrained sequential recommender system 108 bounds the belief tree so that the tree's depth is less than h as will be discussed in greater detail below with reference to FIG. 6.

The series of acts 500 also includes the act 504 of determining a belief of a user type for each user using the bounded belief tree. In particular, each belief point p in the belief tree (e.g., initial point $p_0$) has factored structure $p=(P(\theta), s, t)$ where $P(\theta)$ gives the probability distribution b, over types and s is the current state at time t. Therefore, the resource-constrained sequential recommender system 108 uses the probability distribution associated with the belief point to determine a belief of the user type. In one or more embodiments, the resource-constrained sequential recommender system 108 randomly samples a user type for each user from their respective probability distribution. In some embodiments, the resource-constrained sequential recommender system 108 assumes the user type with the highest probability within the respective probability distributions to be type for each user.

The series of acts 500 further includes an act 510 whereby the resource-constrained sequential recommender system 108 determines whether the dual costs have converged. In particular, the dual costs have converged once the dual costs have stopped changing. If the dual costs have converged, the series of acts 500 proceeds to the act 512 of issuing recommendations to the users according to the joint policy. If the costs have not yet converged, the series of acts 500 proceeds to the act 506 of solving a linear program to obtain dual costs and a joint policy. In particular, the resource-constrained sequential recommender system 108 solves the linear program of equation 8 to obtain a joint policy in accordance with each user's determined type.

Additionally, the series of acts 500 includes an act 508 of solving the planner algorithm subject to the dual costs. In particular, the resource-constrained sequential recommender system 108 uses the cost-augmented planner algorithm provided in equation 7 to determine a new optimized recommendation policy per type of user. Subsequently, the series of acts 500 returns to the act 502 of generating a bounded belief tree. In particular, the resource-constrained sequential recommender system 108 re-generates the tree because the costs incurred by the recommendation policies influence the regret of switching between policies. In particular, as will be discussed in more detail below, the regret affects the size of the belief tree used in issuing recommendations.

If the dual costs have not yet converged and the series of acts 500 returns to the act 506, the resource-constrained sequential recommender system 108 adds the new optimized policies obtained by solving the planner algorithm to the policy set $Z_i$ of equation 8 and solves the linear program again.

As mentioned, when the dual costs have converged, the series of acts 500 proceeds to the act 512 of issuing recommendations to the users according to the joint policy. In particular, the resource-constrained sequential recommender system 108 issues recommendations to the users, using the joint policy obtained from solving the linear program. In particular, the resource-constrained sequential recommender system 108 issues recommendations to users based on policies obtained by assuming the user will act in accordance with the belief in the user's type. The series of acts 500 further includes the act 514 of observing the user's behavior.

Additionally, the series of acts 500 includes an act 516 wherein the resource-constrained sequential recommender system 108 determines whether a terminal point of the belief tree has been reached. If the resource-constrained sequential recommender system 108 determines that a terminal point has been reached, then the series of acts 500 ends and the resource-constrained sequential recommender system 108 continues to provide recommendations based on the belief in the user type associated with that terminal point. If the resource-constrained sequential recommender system 108 determines that a terminal point has not been reached then the series of acts 500 proceeds to an act 518 of updating to a new belief point. In particular, the resource-constrained sequential recommender system 108 uses the observed action of the user to update to a new belief point. After updating to the new belief point, the series of acts 500 returns to the act 512 of issuing recommendations to the users according to the joint policy. Alternatively, the series of acts 500 can return to the act 504 of determining a belief of a user type for each user based on the updated belief point; however, one benefit of the resource-constrained sequential recommender system 108 is that re-planning is not necessary (though optional when time permits).

In general, a belief tree can be used to determine an optimal recommendation policy to follow when the belief point p is a corner of the tree. As mentioned above, a belief point p has factored structure p=(P(θ), s, t) where P(θ) gives the probability distribution b, over types and s is the current state at time t. When p is a corner of the tree, $P(\theta_i)=b(\theta_i)=1$. By exhaustively generating the belief tree from the initial belief point $p_0$ to all reachable belief points until all of the terminal points are corners, the optimal policy can be obtained by starting from the known value at the corners. In particular, at a corner, the optimal policy is an MDP policy computed for model $MDP(\theta_i)$.

However, as mentioned above, exhaustively generating a belief tree to obtain every corner point can lead to an unmanageable model as B expands exponentially. Therefore, the resource-constrained sequential recommender system 108 generates a bounded belief tree where the terminal points of the tree may occur at a time step before the horizon h. By using a bounded belief tree, the resource-constrained sequential recommender system switches over to a MDP policy associated with a belief in a user type before the belief has converged with the user's true type.

Figure 6:
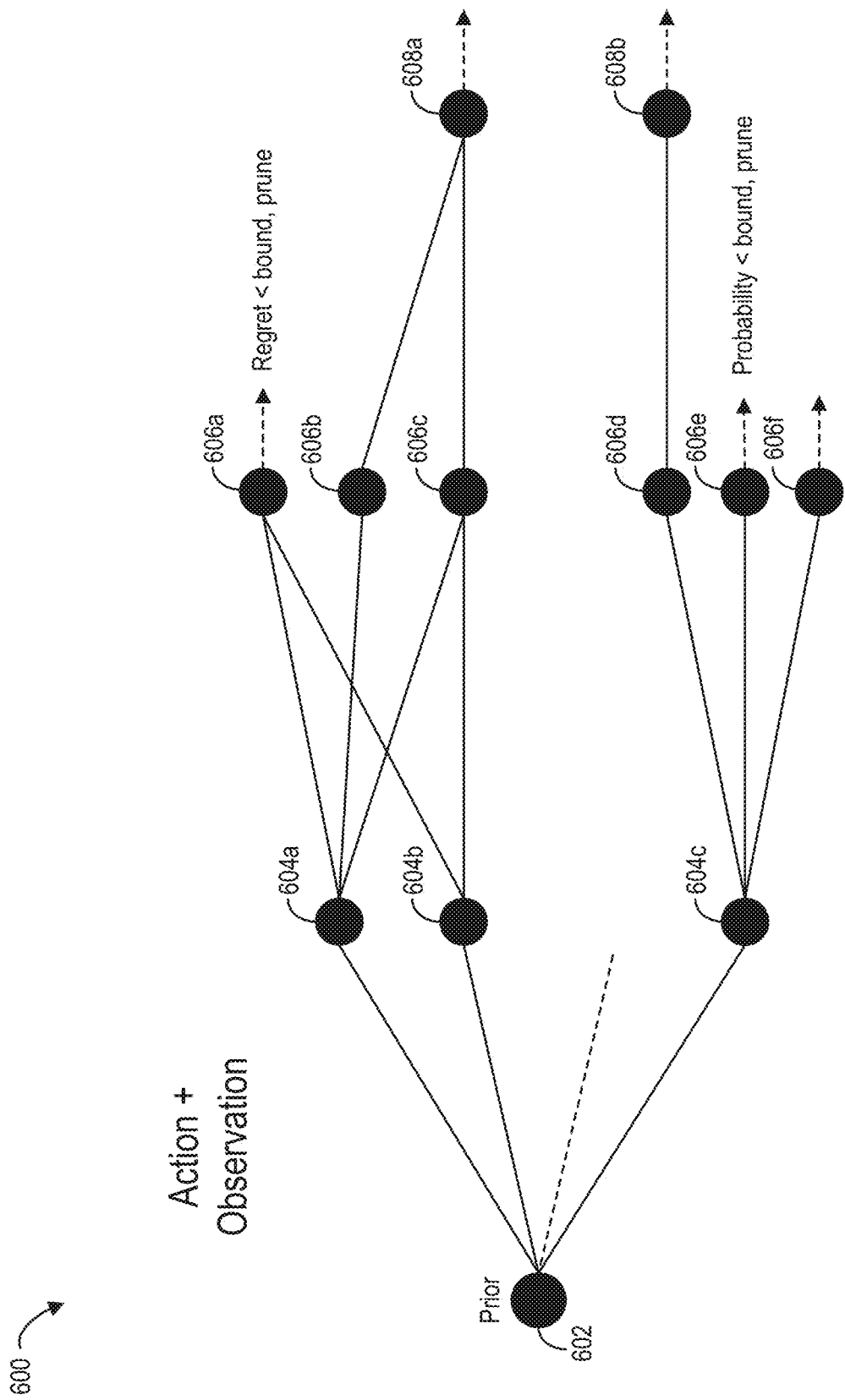
FIG. 6 illustrates a bounded belief tree providing a plurality of belief points in accordance with one or more embodiments.

Indeed, by using a bounded belief tree, the resource-constrained sequential recommender system 108 may only obtain an approximation of a particular user's type—therefore, may only obtain an approximation of the optimal policy for the user. However, by bounding the allowed approximation error, the resource-constrained sequential recommender system 108 can provide a user with a satisfactory policy while avoiding the problems associated with an exhaustively generated belief tree. FIG. 6 illustrates a bounded belief tree 600 providing belief points from which the resource-constrained sequential recommender system 108 can determine a belief of a user type. In particular, the bounded belief tree 600 includes exemplary belief points 602, 604a-604c, 606a-606f, and 608a-608b. In particular, belief point 602 represents an initial belief point (i.e., the root of the belief tree) associated with an initial time step and the belief points 604a-604c, 606a-606f, and 608a-608b represent subsequent reachable belief points associated with subsequent time steps. As should be noted, the bounded belief tree 600 is an exemplary belief tree and is made much smaller than would generally be generated by the resource-constrained sequential recommender system 108 for simplicity.

In particular, FIG. 6 provides an illustration of techniques used by the resource-constrained sequential recommender system 108 to bound the belief tree 600. In particular, the resource-constrained sequential recommender system 108 bounds the belief tree 600 through probability bounding and regret bounding. In particular, through probability bounding, the resource-constrained sequential recommender system 108 does not include a belief point within the belief tree 600 if the probability of reaching the belief point does not exceed a probability threshold. For example, if the resource-constrained sequential recommender system 108 set the probability threshold to 0.00001, then the resource-constrained sequential recommender system can exclude a belief point from the belief tree unless the probability of reaching that belief point is greater than 0.00001. In particular, the probability of reaching a given belief point is defined as the product of the observation probabilities along an action-observation history.

As mentioned, the resource-constrained sequential recommender system 108 additionally bounds the belief tree 600 through regret bounding. In particular, because the resource-constrained sequential recommender system 108 can switch to a recommendation policy associated with a belief in a user type before the belief converges with the user's true type—therefore, the resource-constrained sequential recommender system 108 risks using a recommendation policy that is not in accordance with the user's true type—the resource-constrained sequential recommender system 108 uses regret bounding to minimize the regret experienced by using a sub-optimal policy for the user's true type. In other words, using regret bounding allows the resource-constrained sequential recommender system 108 to stop expanding the belief tree 600 beyond a certain belief point if the regret experienced by using a belief in the user type associated with that belief point to obtain a recommendation policy is smaller than some threshold value.

When switching to an MDP policy early, the resource-constrained sequential recommender system 108 incurs regret proportional to the probability that the resource-constrained sequential recommender system 108 is applying the policy for $\theta_i$ to the user type $\theta_j$. If $\pi_i^*$ represents the optimal policy for user type $\theta_i$, providing the expected value $V_{\theta_i,\pi_i}^*$, but $\pi_i^*$ is applied to the user type $\theta_j$, the expected value is $V_{\theta_i}^{\pi_i*}$. By definition of optimality, $V_{\theta_j,\pi_i}^* \leq V_{\theta_j,\pi_j}^*$. Therefore, by using the policy $\pi_i^*$, the resource-constrained sequential recommender system 108 incurs a regret as follows:

$$\text{REGRET}(p,i) = \Sigma_{j=1}^{|\Theta|}(b(\theta_j) \cdot (V_{\theta_j,\pi_j}^*)) \quad (9)$$

At a given belief point p, the best recommendation policy to choose is the policy that minimizes this regret. Therefore, the recommender policy 108 uses $$\text{REGRET}(p) \geq \min_i(\text{REGRET}(p,i)) \quad (10)$$

Because the resource-constrained sequential recommender system 108 computes the recommendation policies over the entire horizon h, the resource-constrained sequential recommender system 108 also computes the regret for the initial belief point $p_0$ (e.g., the belief point 602). The value of $\text{REGRET}(p_0)$ gives an upper bound with which the resource-constrained sequential recommender system 108 can compare the regret at any subsequent belief state. Using an approximation strength $\alpha \in [0, 1]$, the resource-constrained sequential recommender system 108 generates subsequent belief points while $$\text{REGRET}(p) \geq \alpha \text{REGRET}(p_0) \quad (11)$$

Thus, through regret bounding, the resource-constrained sequential recommender system 108 terminates generation of the belief tree before the corners are reached. Thus, the resulting belief tree has a depth smaller than h. However, the resource-constrained sequential recommender system 108 can treat each terminal point as a corner of the belief tree and can permanently switch over to a recommendation policy associated with a user type determined from the terminal point. By using equations 10 and 11 to minimize the regret of switching over to the policy obtained using the terminal point, the resource-constrained sequential recommender system 108 avoids permanently switching over to a recommendation policy too early, which would risk following a policy that is vastly different from the particular user's optimal policy.

The acts and algorithms discussed above in relation to FIGS. 5-6, in one or more embodiments, can comprise the corresponding structure for performing a step for determining recommendations for the plurality of users by taking into account user types, the plurality of resource constraints, the plurality of expected resource consumptions, the sequential history of user actions for each user of the plurality of users, and the current state of each user. In particular, the acts and algorithms of discussed above in relation to FIGS. 5-6 can comprise the corresponding structure for performing a step for determining recommendations for the plurality of users by taking into account user types, the plurality of resource constraints, the plurality of expected resource consumptions, the sequential history of user actions for each user of the plurality of users, and the current state of each user using bounded-regret belief space planning.

The state diagram of FIG. 5 illustrates an embodiment of using bounded-regret belief space planning that the resource-constrained sequential recommender system 108 can utilize to solve a CPOMIDP in a multi-agent, constrained setting. Algorithm 2 presented below is another characterization of using bounded-regret belief space planning that the resource-constrained sequential recommender system 108 can utilize to solve a CPOMIDP in a multi-agent, constrained setting.

| Algorithm 2 |
|---|
| Given MOMDP M over MDP models $\theta_i$, approximation $\alpha$ |
| 1:    Plan $\pi_j^*$ for all j |
| 2:    Compute $V\theta_i,\pi_j$ for all i, j |
| 3:    Generate B' = SAMPLEBELIEF(M, $V_{\theta,\pi}$, $\alpha$) |
| 4:    for time t = h →1 do |
| 5:      for belief b ∈ B' (t) do |
| 6:        V[b] = -∞ |
| 7:        for action a ∈ A do |
| 8:          Q[b, a] = R(b, a) |
| 9:          for observation o ∈ O do |
| 10:            b' = UPDATEBELIEF(b, a, o) |
| 11:            if b' ∈ B' then |
| 12:              Q[b, a] = Q[b, a] + P(o | b, a) · V[b'] |
| 13:            else |
| 14:              j = arg min$_j$ REGRET(b', j) |
| 15:              Q[b, a] = Q[b,a] + P(o | b, a)$\Sigma_{i-1}^{|\Theta|}$ b'($\theta_i$) · $V_{\theta_i,\pi_j}^*$ |
| 14:            end if |
| 17:            end for |
| 18:          V[b] = max (V[b],Q[b,a]) |
| 19:        end for |
| 20:      end for |
| 21:    end for |

Algorithm 2 an embodiment of an expectation belief space planning algorithm. As shown, the resource-constrained sequential recommender system 108 starts by computing the optimal MDP policy $\pi_j^*$ for each type $\theta_j$ in line 1, followed by determining the expected values $V_{\theta_i,\pi_j}^*$ of these policies on every type $\theta_i$ on line 2. The resource-constrained sequential recommender system 108 uses these values on line 3 in the belief state sampling to bound the number of belief states generated according to equation (11). In the remainder of the algorithm, the resource-constrained sequential recommender system 108 computes expected values at each of the generated belief points backwards over time, according to the typical dynamic programming algorithm, except in case a value is needed for a missing belief point on line 13. In case of a missing point b', the resource-constrained sequential recommender system 108 selects the minimum regret policy $\pi_j^*$ in line 14, and the resource-constrained sequential recommender system 108 computes the expected value of using this policy according to the belief state. Because the expected value of the MDP policies is exact, and b' describes the state distribution that is reached in expectation, the expected value at any 'missing' belief state is also exact. Therefore, $V[b_0]$ is the true expectation of the (potentially suboptimal) value obtained by executing the policy computed by algorithm 2. Therefore, by using algorithm 2, the resource-constrained sequential recommender system 108 avoids all three weaknesses of existing approximate POMDP solvers: it is a finite horizon solver without discounting, it computes exact expectations, and it maintains a reduced belief state space by using the properties of the models.

In one or more embodiments, Algorithm 2 can comprise the corresponding structure for performing a step for determining recommendations for the plurality of users by taking into account user types, the plurality of resource constraints, the plurality of expected resource consumptions, the sequential history of user actions for each user of the plurality of users, and the current state of each user. In particular, Algorithm 2 can comprise the corresponding structure for performing a step for determining recommendations for the plurality of users by taking into account user types, the plurality of resource constraints, the plurality of expected resource consumptions, the sequential history of user actions for each user of the plurality of users, and the current state of each user using bounded-regret belief space planning.

Figure 7:
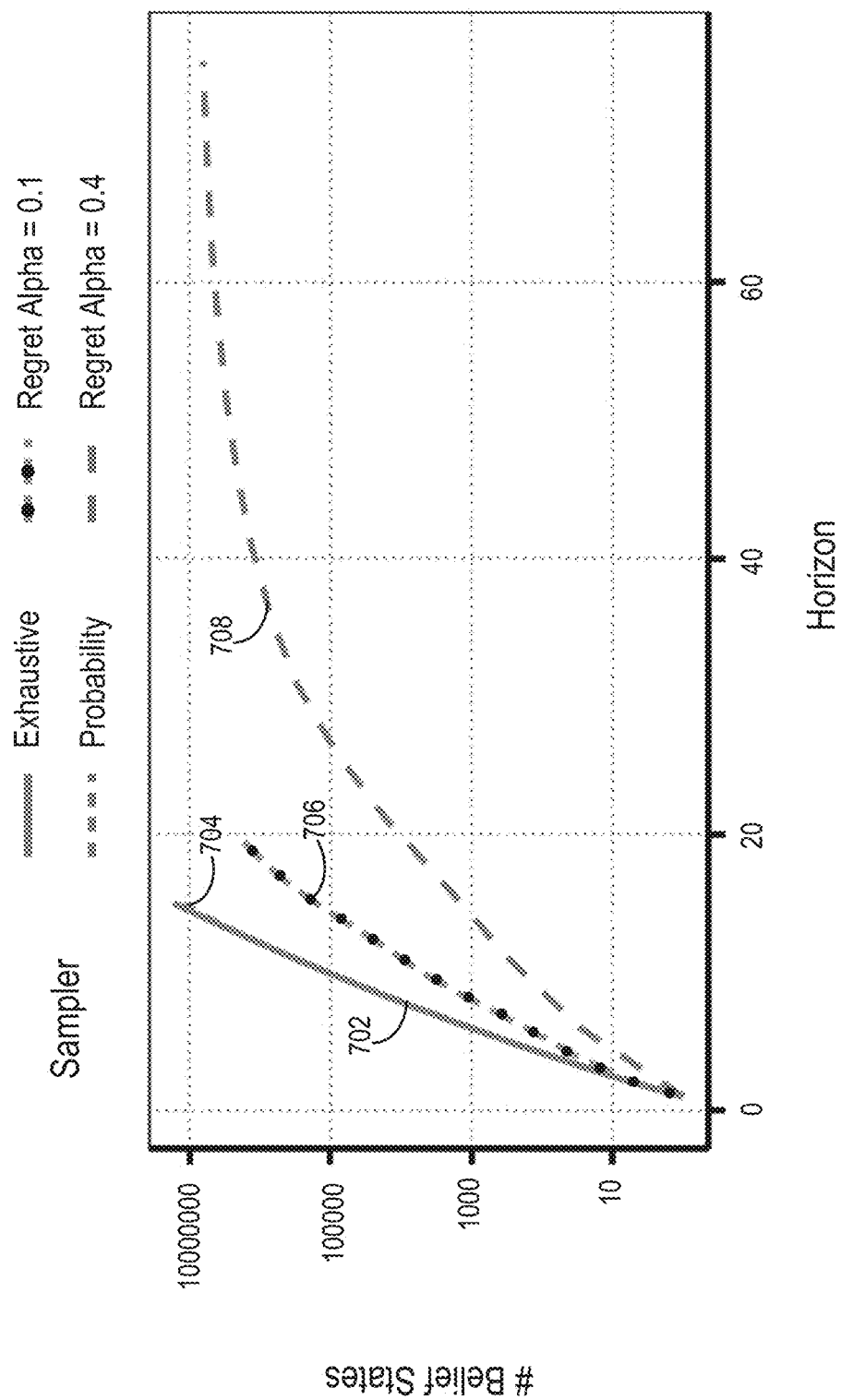
FIG. 7 illustrates a graph comparing the belief state size of several belief trees in accordance with one or more embodiments.

Through bounding, the resource-constrained sequential recommender system limits the expansion of belief space B (i.e., the number of belief points) and generates a belief tree that is more manageable than if the tree were generated exhaustively. FIG. 7 illustrates a graph comparing the size of B for unbounded belief trees and belief trees that are bounded using varying factors. In particular, the graph of FIG. 7 demonstrates the size B on a nine state, two type recommendation problem under different bounding methods.

As illustrated by FIG. 7, the curve 702 represents the size of an exhaustively generated belief tree and curve 704 represents the size of a belief tree bounded by a probability threshold of 0.00001 (i.e., a belief point p is only included in the belief tree if the probability of reaching p is greater than 0.00001). Note, that the curves 702 and 704 are overlapping, indicating that simply applying a probability bound while generating a belief tree does not significantly reduce the size of B over an exhaustively generated tree.

Additionally, the graph of FIG. 7 includes the curve 706, which represents a belief tree probability bounded by the probability threshold 0.00001 and regret bounded using an approximation strength $\alpha=0.1$. Further, the graph includes the curve 708, which represents a belief tree probability bounded by the probability threshold 0.00001 and regret bounded using an approximation strength $\alpha=0.4$. As illustrated by the curves 706 and 708, the regret bounding is effective in reducing the total size of B. In particular, the curves 706 and 708 show that a higher value of a leads to a more limited belief space. Indeed, the flattening of the curve 708 shows that the size of the belief space stops increasing beyond a given horizon, which is caused by all generated belief points being either converged sufficiently (i.e., the regret of the belief point satisfies equation 11) or vanishingly unlikely (i.e., the probability of reaching the belief point does not exceed the probability threshold).

Figure 8:
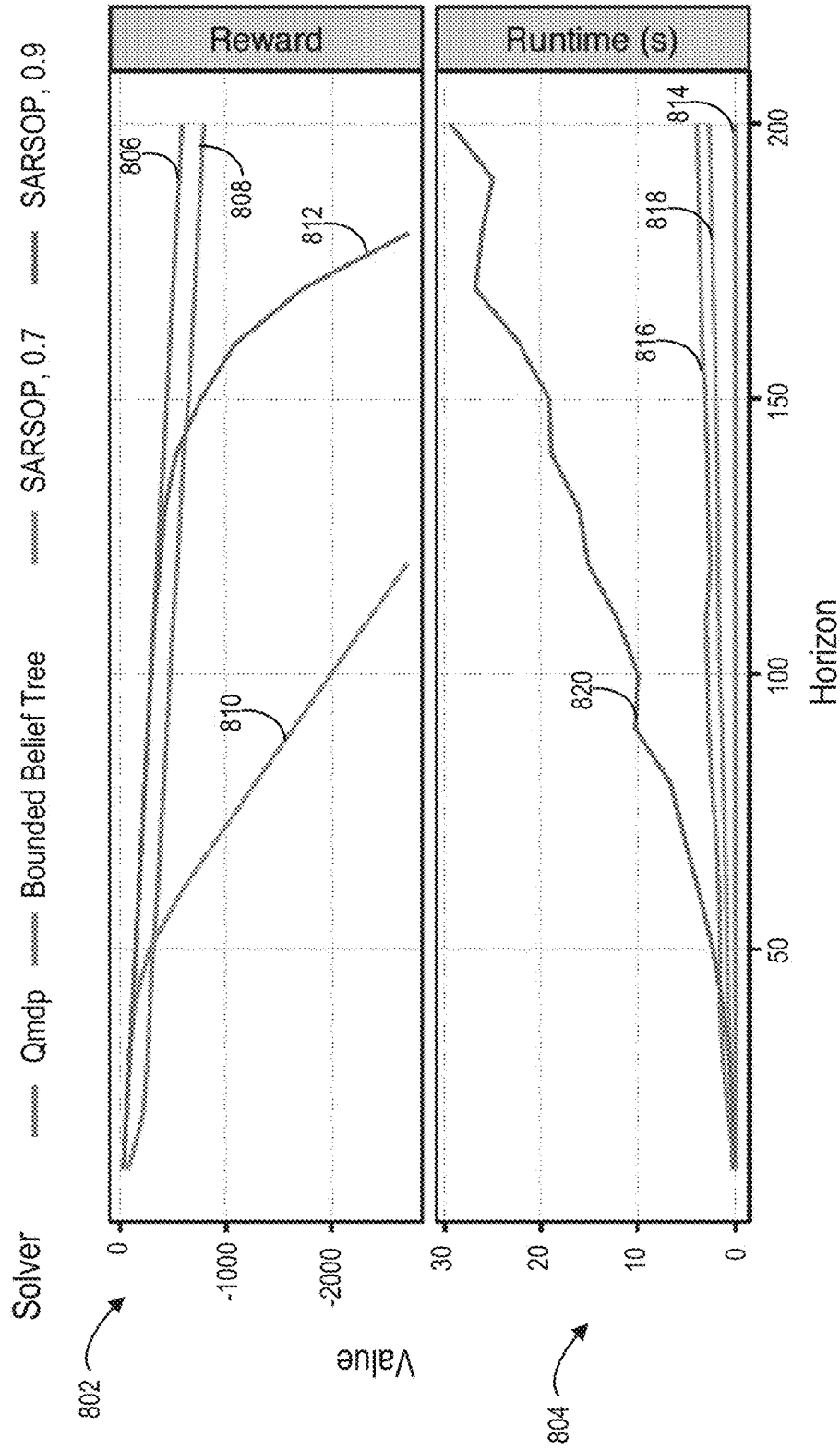
FIGS. 8-9 illustrate multiple graphs comparing the performance of several approaches to generating recommendation policies in accordance with one or more embodiments.

As mentioned above, because the resource-constrained sequential recommender system 108 bounds the belief space of the belief tree, one or more embodiments only obtain an approximation of the optimal recommendation policy for each user. FIG. 8 illustrates graphs 802 and 804, which show the effect of the reduced belief space on the performance of the resource-constrained sequential recommender system 108 by comparing the data obtained from using the bounded belief tree with data obtained from using SARSOP and QMDP. In particular, the graphs 802 and 804 are generated using the same data used for FIGS. 2-3.

In particular, QMDP provides a solution to a MOMDP by selecting one action per state and determining, for each action, what will be the value in each of the corners of the beliefs and then treating that determination as the entire policy. In particular, $Q_{MDP}$ scales well (i.e., maintains relatively good performance as the horizon increases) but does not perform information gathering, as will be discussed in more detail with reference to FIG. 12. SARSOP can also provide a solution to a MOMDP. In particular, the SARSOP approach is an infinite horizon planning approach that incorporates discounting in its calculation of a recommendation's reward to keep the required look ahead bounded. Consequently, SARSOP returns approximate solutions and associated approximation errors. Therefore, while SARSOP generally performs well at finding optimal policies where the horizons are small, SARSOP does not scale well, meaning that the quality of its policies can decrease significantly as the horizon increases (i.e., the approximation errors provide a greater negative impact on the selection of recommendation policies).

Returning to FIG. 8, the graph 802 provides data showing the value of the recommendations provided by each solution to the MOMDP. In particular, includes $Q_{MDP}$ curve 806, bounded belief tree curve 808, SARSOP_0.7 curve 810, and SARSOP_0.9 curve 812. Comparing the $Q_{MDP}$ curve 806 with the bounded belief tree curve 808 indicates that there is not a significant difference in the rewards obtained by using $Q_{MDP}$ or the bounded belief tree to solve the MOMDP. However, the graph 802 shows that using the bounded belief tree provides significant improvement in scalability over the SARSOP approach as is illustrated by comparing the bounded belief tree curve 808 to the SARSOP_0.7 curve 810 and the SARSOP_0.9 curve 812. Further, the graph 802 illustrates that employing a higher discount factor in the SARSOP provides an improvement over scalability, the value of the rewards still drops significantly when the horizon becomes too large.

As illustrated by FIG. 8, the graph 804 provides data showing the runtime required by each solution to the MOMDP to provide recommendations. In particular, graph 804 includes the $Q_{MDP}$ curve 814, the bounded belief curve 816, the SARSOP_0.7 curve 816, and the SARSOP_0.9 curve 818, which each correspond to the respective curve from graph 802. In particular, the QMDP curve 814, the bounded belief curve 816, and the SARSOP_0.7 curve 818 each show that the respective approach to the MOMDP can provide recommendations in a timely manner (however, the poor scalability of SARSOP shown by the SARSOP_0.7 curve 810 of graph 802 maintains that SARSOP is an undesirable approach). The SARSOP_0.9 curve 820 shows that, while the larger discount factor may provide better scalability, the runtime increases significantly, rendering such an approach undesirable.

Figure 9:
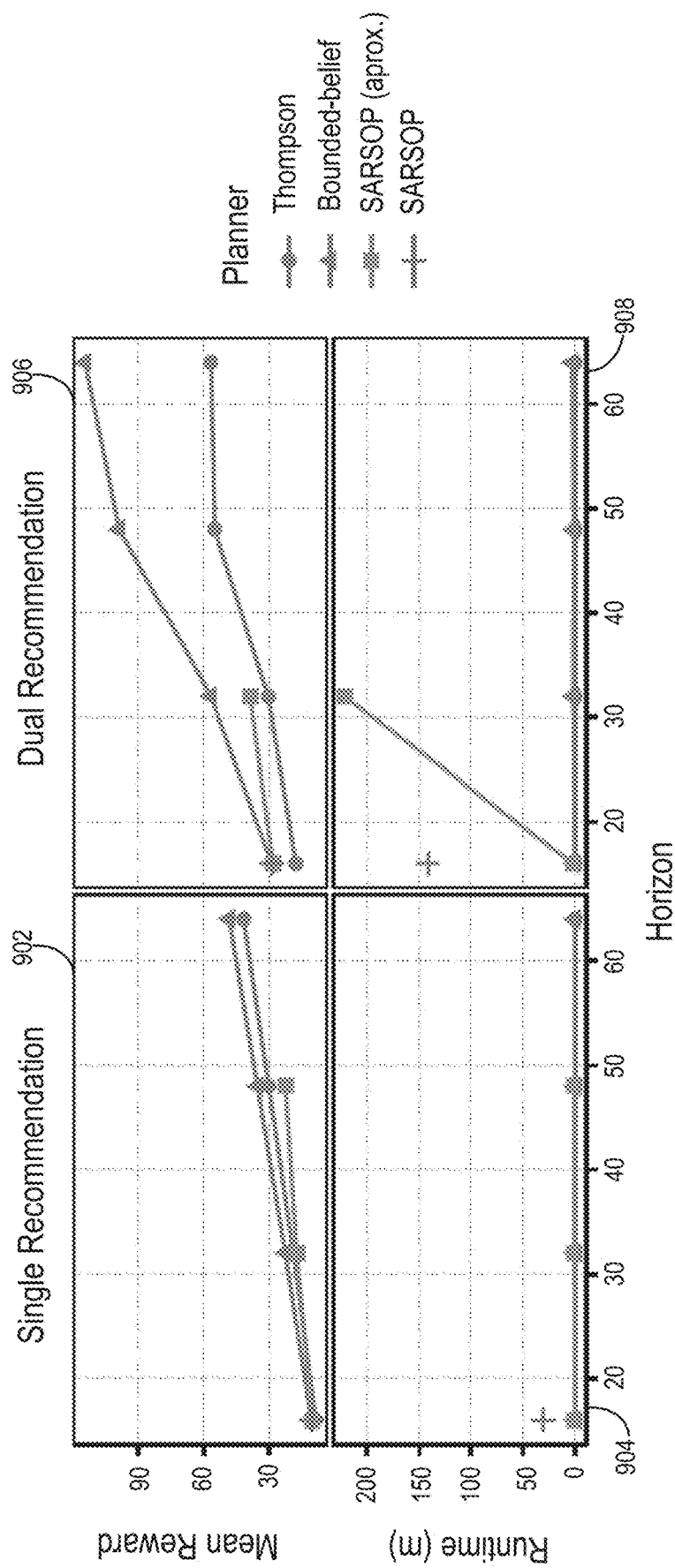

FIG. 9 illustrates graphs 902, 904, 906, and 908 which also compare the performance of different approaches of providing recommendations to users. In particular, graphs 902 and 904 compare the performance in providing a single recommendation to a user and graphs 906 and 908 compare the performance in providing dual recommendations to a user. More specifically, the graphs 902-908 compare the performance of Thompson sampling, a bounded belief tree approach having an approximation strength $\alpha=0.1$ and a probability threshold of 0.002, and two modes of a SARSOP approach using a discount factor of 0.8. In particular, the first SARSOP mode is allowed to converge to an optimality gap of 0.0001, which should return an essentially optimal policy. The second mode sets an absolute gap of 0.5, which should result in an approximate policy that is computed significantly faster. In particular, the graphs 902-908 provide data taken from the same tourist data used in FIG. 7, using five locations, three user types and a PST depth of 1. In particular, the quality of the computed policy is measured over 250 simulations and the computation time is measured by elapsed clock time.

As mentioned, graphs 902 and 904 reports results where the resource-constrained sequential recommender system 108 issues a single recommendation at a time. Because agents generally respond in the same manner to receiving a recommendation, there are no information gathering actions for a single recommendation problem. This is illustrated by graph 902 in that there is no significant difference between the performance in Thompson sampling, which does not perform information gathering, and the other approaches. Further, graph 904 shows that there is no significant difference in the time required to compute the policies.

As mentioned, graphs 906 and 908 report results where the resource-constrained sequential recommender system 108 issues dual recommendations (i.e., a recommendation and an alternative). Because a dual recommendation strategy allows users to specify a preference, information gathering actions are performed. As a result, the planning problem becomes significantly harder to the point that SARSOP is not able to converge to the optimal solution for a h=32 instance even after ten hours. As Thompson sampling does not explicitly perform information gathering actions, the quality of the recommendations is significantly worse than both SARSOP and the bounded belief tree as shown in graph 906 even though the time required to compute the recommendation policies is similar to that of the bounded belief tree as shown in graph 908.

Figure 10:
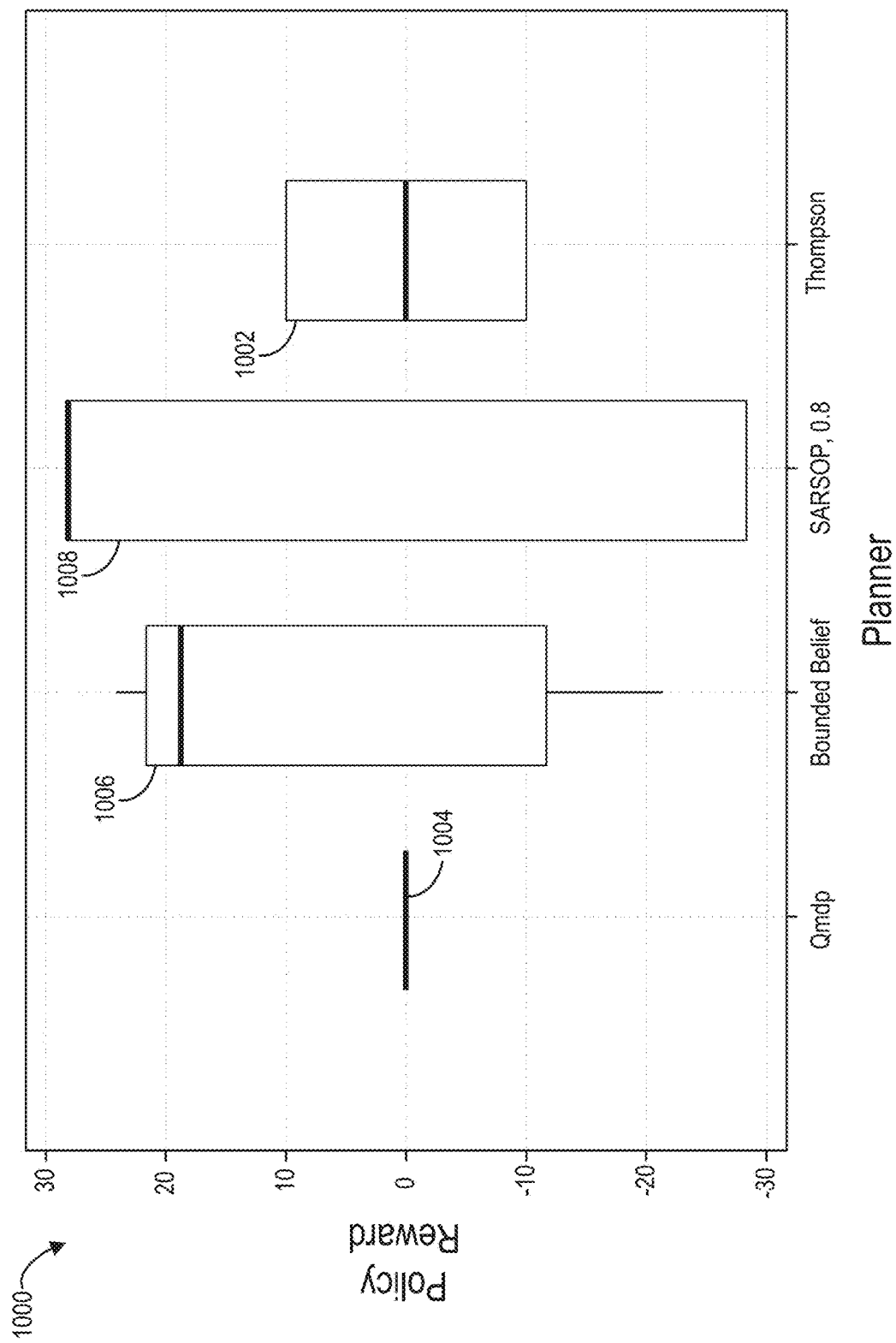
FIG. 10 illustrates a graph comparing reward values of computed recommendation policies in a problem where there is explicit information gathering in accordance with one or more embodiments.

FIG. 10 illustrates a graph 1000 of box plots providing results of the reward of computed recommendation policies in a problem where there is explicit information gathering (e.g., a dual recommendation strategy). In particular, the box plots provided by the graph 1000 are constructed from data designed with the purpose of showing the performance of each approach where information gathering is needed. Specifically, the graph 1000 includes Thompson box plot 1002, $Q_{MDP}$ box plot 1004, bounded belief tree box plot 1006, and SARSOP box plot 1008. In particular, the SARSOP box plot 1008 represents a SARSOP approach having a discount factor of 0.8.

As mentioned, the graph 1000 includes Thompson box plot 1002. In particular, the Thompson box plot 1002 shows that, where information gathering is required, Thompson sampling provides recommendations with a mean reward value of zero, because Thompson sampling does not perform information gathering acts. Further, the Thompson box plot 1002 shows that there is an even variance in the policy rewards chosen by Thompson sampling. In particular, even though Thompson sampling does not perform information gathering, the approach sometimes chooses the correct policy leading to a positive policy reward. But, as shown by the Thompson box plot 1002, Thompson sampling can also choose the wrong policy, providing a policy with a negative reward value.

The graph 1000 also includes $Q_{MDP}$ box plot 1004. As previously mentioned, the $Q_{MDP}$ approach also does not perform information gathering, leading to a mean reward value of zero. For this particular problem design, the $Q_{MDP}$ approach also has no variance in its policy rewards because it never discovers which user type it should base its recommendation policy on. However, the $Q_{MDP}$ approach can have variance in its policy rewards. Therefore, in one or more embodiments, $Q_{MDP}$ box plot 1004 looks similar to Thompson box plot 1002.

The graph 1000 also includes bounded belief tree box plot 1006. In particular, the bounded belief tree box plot 1006 has a positive mean reward value, showing that the bounded belief tree approach allows the resource-constrained sequential recommender system 108 to typically find the correct user type. Further, the bounded belief tree box plot 1006 shows that, while the bounded belief tree approach can lead to negative policy rewards, the policy reward values are generally positive as seen by the variance of the plot. Though the bounded belief tree box plot 1006 does not have the highest possible rewards or the highest reward value mean out of all the compared approaches, graph 1000 shows that the bounded belief tree approach provides the best overall performance.

As mentioned, the graph 1000 also includes the SARSOP box plot 1008. In particular, the SARSOP box plot 1008 has a positive mean reward value—higher than the bounded belief tree box plot 1006. Indeed, because the SARSOP approach does perform information gathering, the approach can use the information to improve the chosen recommendation policies. Further, the SARSOP box plot 1008 shows that the SARSOP approach provides higher possible reward values. However, the variance of SARSOP box plot 1008 also shows that the SARSOP approach can also provide policies having the most negative policy rewards out of all the compared approaches. In particular, because SARSOP is an infinite horizon planner using a discount factor in choosing recommendation policies, one or more embodiments of SARSOP can only find recommendation policies that provide value only up until a certain time step where the horizon of the problem is too large. In other words, while SARSOP box plot 1008 shows that the SARSOP approach typically finds the correct user type, it can also make more costly mistakes, leading to a wider variance in policy reward values.

Figure 11A:
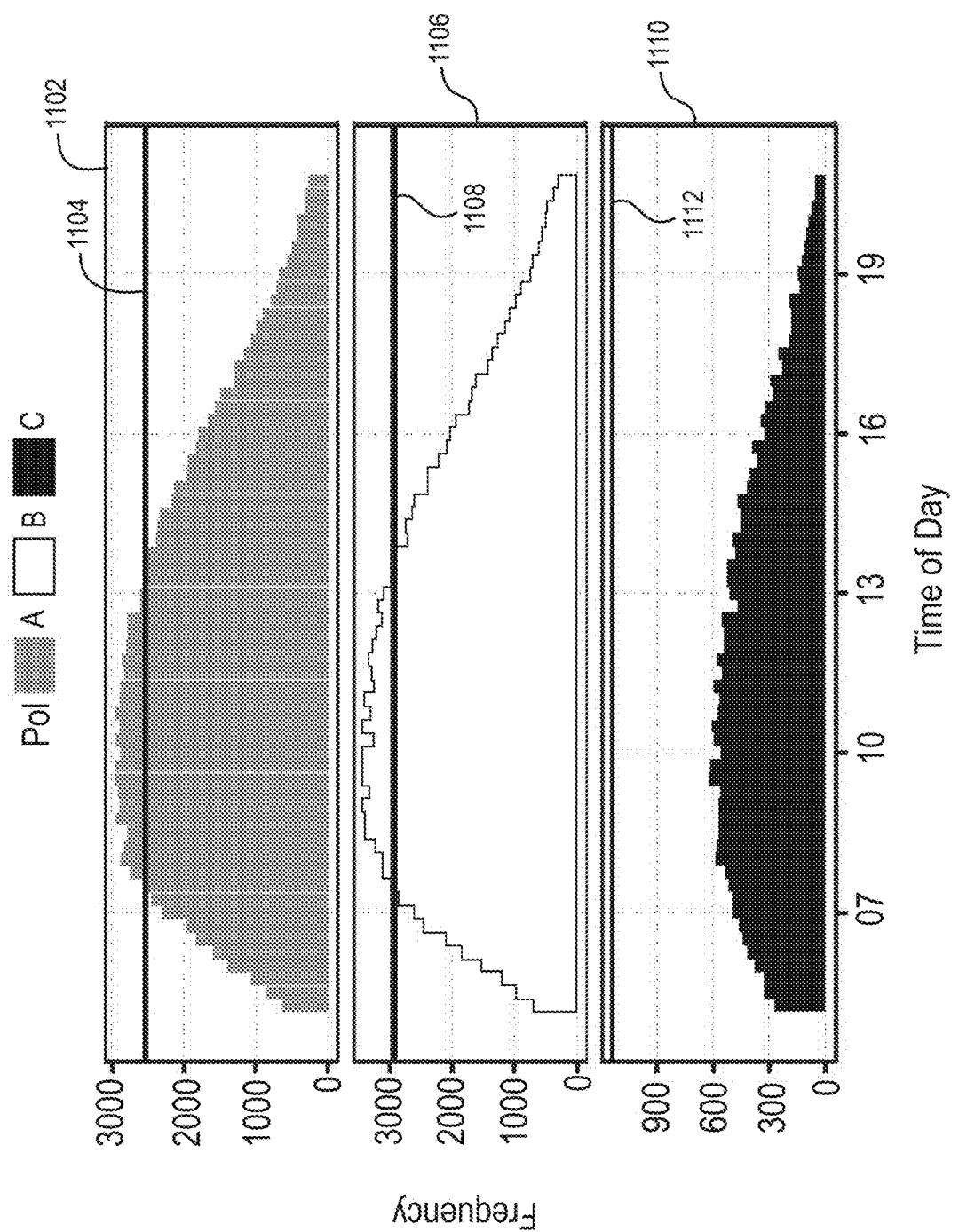
FIG. 11A illustrates a graph providing data of the number of visitors located at various points of interest without recommendations in accordance with one or more embodiments.
Figure 11B:
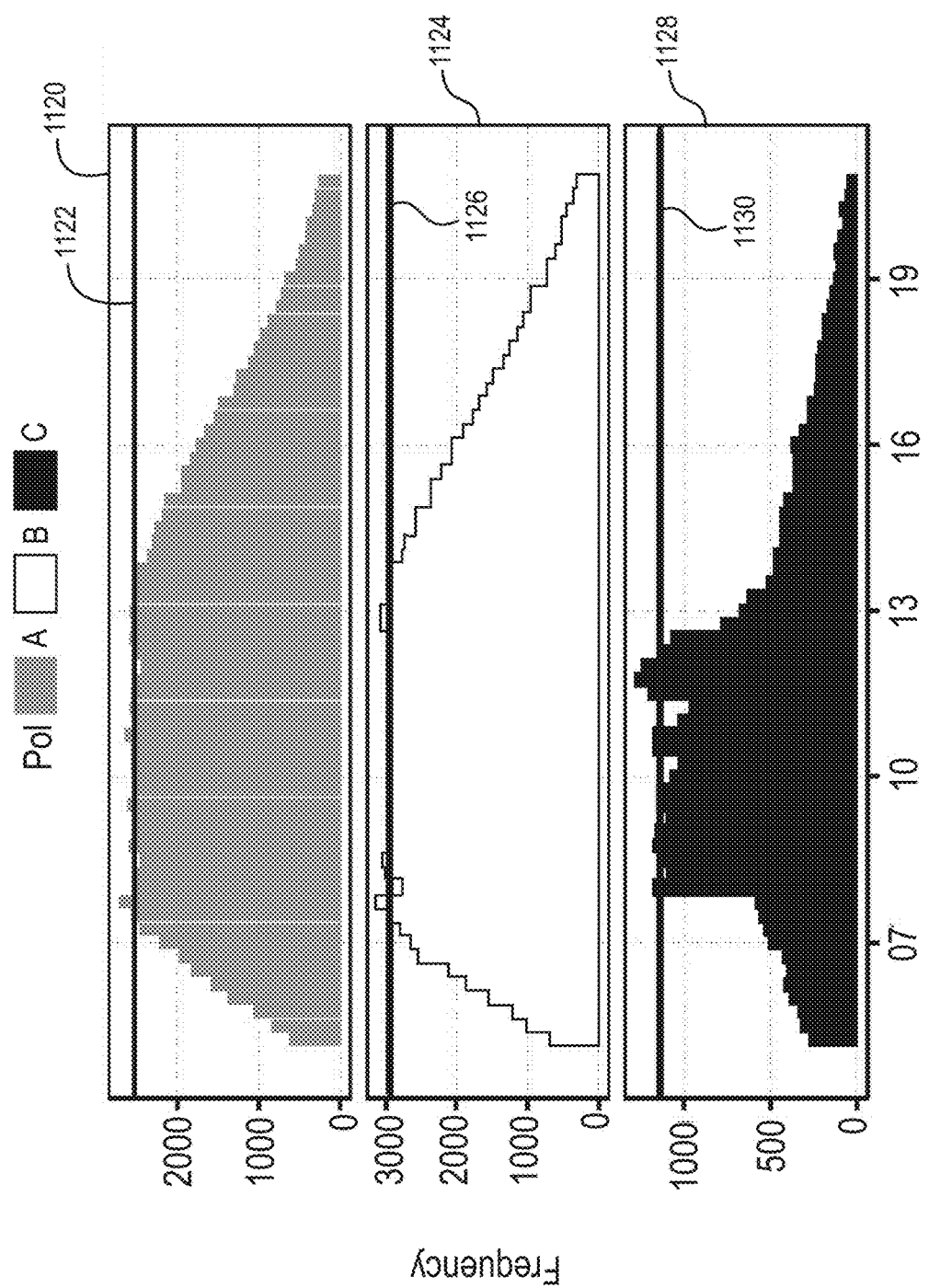
FIG. 11B illustrates a graph providing data of the number of visitors located at various points of interest as a result of recommendation policies in accordance with one or more embodiments.

FIGS. 11A-11B illustrate the effect of providing recommendation policies to multiple agents using one or more embodiments. In particular, FIGS. 11A-11B comprises real data representing the number of visitors at various points of interest of an amusement park at various times throughout the day. For example, FIG. 11A provides data illustrating the number of visitors at three separate points of interest within the amusement park without using any recommendation policies. In particular, FIG. 11A comprises a graph for POI_A 1102, a graph for POI_B 1106, and a graph for POI_C 1108. As can be seen in the graph for POI_A 1102, there is a significant period of the day in which the number of visitors at point of interest A exceeds the capacity (represented by capacity line 1104) of that particular point of interest. Similarly, the graph for POI_B 1106 shows that there is a significant period in which the number of visitors at point of interest B exceeds its capacity (represented by capacity line 1108). By contrast, the graph for POI_C 1110 shows that the number of visitors to point of interest C never exceeds its capacity (represented by capacity line 1112).

FIG. 11B provides data illustrating the number of visitors at the same three points of interest within the amusement while one or more embodiments used recommendation policies to provide recommendations to the users. In particular, FIG. 11B shows data wherein one or more embodiments provided recommendation policies for 16,000 visitors using a $Q_{MDP}$ solution to a MOMDP planning problem. For example, FIG. 11B includes the graph for POI_A 1120, which shows that the number of visitors at point of interest A significantly decreased for the same time period at which point of interest A was crowded when no recommendations were provided. In particular, the graph for POI_A 1120 shows that there is not a significant number of visitors exceeding the capacity of point of interest A (represented by capacity line 1122) at any given time. Similarly, the graph for POI_B 1124 shows that there is not a significant number of visitors at point of interest B exceeding its capacity (represented by capacity line 1126) at any given time. In contrast, the graph for POI_C 1128 shows that the number of visitors visiting point of interest C has significantly increased using recommendation policies. In particular, the number of visitors visiting point of interest C increased for the same time period at which point of interest A and point of interest B experienced crowding where no recommendations were provided, indicating that the resource-constrained sequential recommender system 108 diverted a significant number of visitors away from points of interest A and B to point of interest C until the number of visitors at point of interest C neared or exceeded its capacity (represented by capacity line 1130).

Figure 12:
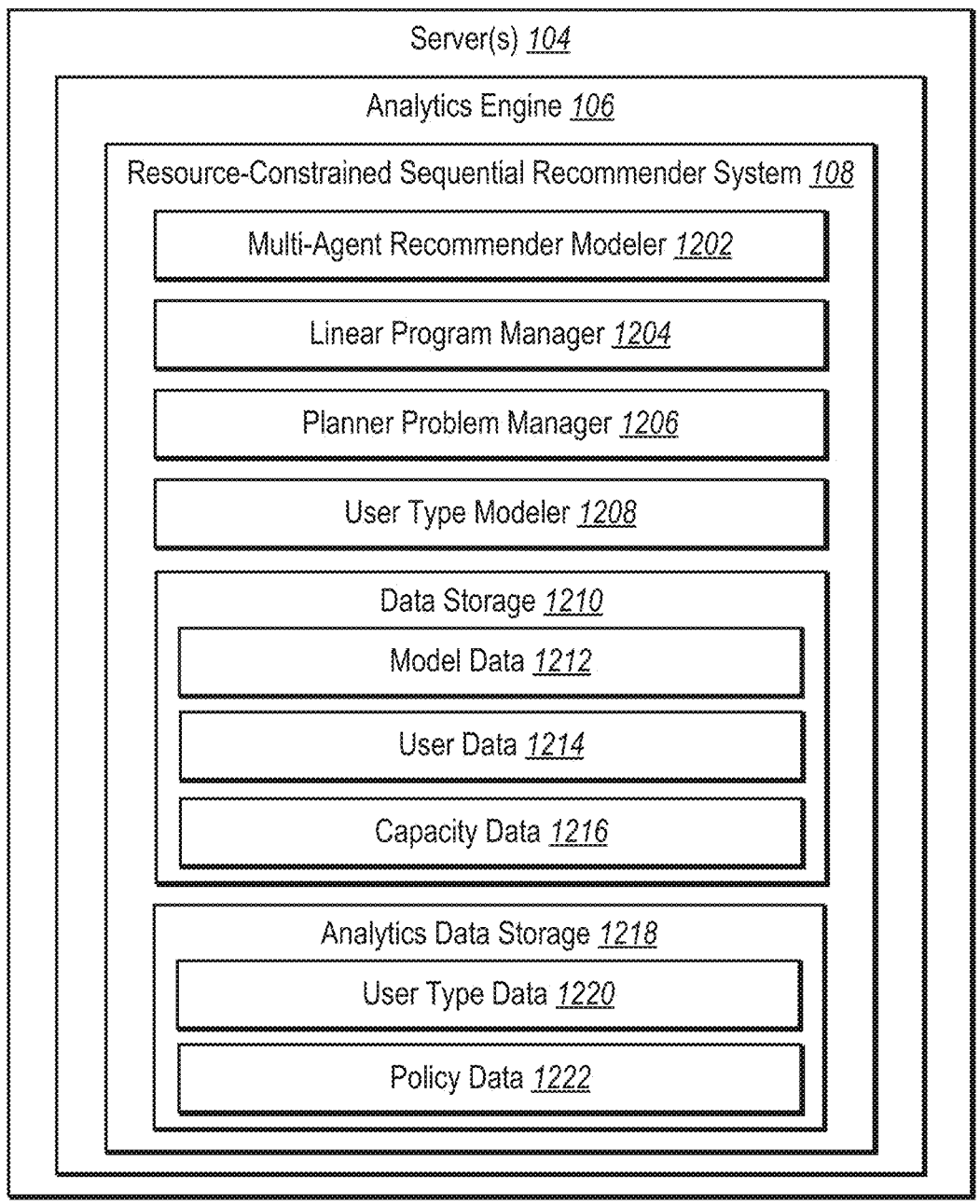
FIG. 12 illustrates an example schematic diagram of a resource-constrained sequential recommender system in accordance with one or more embodiments.

FIG. 12 illustrates a detailed schematic diagram of an example architecture of the resource-constrained sequential recommender system 108 of FIG. 1. As shown, the resource-constrained sequential recommender system 108 can be part of server(s) 104 and analytics engine 106. Additionally, the resource-constrained sequential recommender system 108 can include, but is not limited to, a multi-agent recommender modeler 1202, a linear program manager 1204, a planner problem manager 1206, a user type modeler 1208, data storage 1210 and analytics data storage 1218.

In one or more embodiments, each of the components of the resource-constrained sequential recommender system 108 are in communication with one another using any suitable communication technologies. Additionally, the components of the resource-constrained sequential recommender system 108 can be in communication with one or more other devices including a client device of a user. It will be recognized that although the components of the resource-constrained sequential recommender system 108 are shown to be separate in FIG. 12, any of the subcomponents may be combined into fewer components, such as into a single component, or divided into more components as may serve a particular implementation. Furthermore, although the components of FIG. 12 are described in connection with the resource-constrained sequential recommender system 108, at least some components for performing operations in conjunction with the resource-constrained sequential recommender system 108 described herein may be implemented on other devices within the environment.

The components of the resource-constrained sequential recommender system 108 can include software, hardware, or both. For example, the components of the resource-constrained sequential recommender system 108 can include one or more instructions stored on a computer readable storage medium and executable by processors of one or more computing devices or, alternatively, by servers (e.g., server(s) 104) of a system. When executed by the one or more processors or servers, the computer-executable instructions of the resource-constrained sequential recommender system 108 can cause the computing device or system to perform the training and estimation functions described herein. Alternatively, the components of the time-to-open modeling system 108 can comprise hardware, such as a special purpose processing device to perform a certain function or group of functions. Additionally, or alternatively, the components of the resource-constrained sequential recommender system 108 can include a combination of computer-executable instructions and hardware.

Furthermore, the components of the resource-constrained sequential recommender system 108 performing the functions described herein with respect to the resource-constrained sequential recommender system 108 can, for example, be implemented as part of a stand-alone application, as a module of an application, as a plug-in for applications including electronic messaging applications, as a library function or functions that may be called by other applications, and/or as a cloud-computing model. Thus, the components of the resource-constrained sequential recommender system 108 may be implemented as part of a stand-alone application on a personal computing device or a mobile device. Alternatively, or additionally, the components of the resource-constrained sequential recommender system 108 may be implemented in any application that allows creation and delivery of electronic messages to recipients.

As shown in FIG. 12, the resource-constrained sequential recommender system 108 includes the multi-agent recommender modeler 1202. In particular, the multi-agent recommender modeler 1202 builds the model used to provide optimal recommendation policies for a plurality of users in a context in which resources are constrained. For example, in one or more embodiments, the multi-agent recommender modeler merges a Parametric Markov Decision Process and a Constrained Multi-agent Markov Decision Process to produce a model incorporating features of each. In some embodiments, the multi-agent recommender modeler 1202 modifies the transition function of the merged model to include the population dynamics of the environment in which the resource-constrained sequential recommender system 108 will operate.

As shown in FIG. 12, the resource-constrained sequential recommender system 108 also includes the linear program manager 1204. In particular, the linear program modeler 1204 solves the linear program given by equation 6 to produce a mix of policies to assign to each user. In particular, each policy from the mix of policies is chosen from a set of policies available to a particular user (i.e., user type). In one or more embodiments, the linear program modeler 1204 solves the linear program subject to resource constraints. In some embodiments, by solving the linear program, the linear program modeler 1204 also obtains an array of costs to be used by a planner algorithm, which it provides to the planner problem manager 1206. In one or more embodiments, once the dual costs have converged (i.e., stopped changing), the linear program modeler 1204 assigns the mix of policies to the users.

As shown in FIG. 12, the resource-constrained sequential recommender system 108 also includes the planner problem manager 1206. In particular, the planner problem manager 1206 uses the dual costs obtained by solving the linear program to solve the planner algorithm provided by equation 7. In one or more embodiments, by solving the planner algorithm, the planner problem manager 1206 obtains a new policy for each user (i.e., user type) to add to the set of available policies for each user which will be used by the linear program modeler 1206 to solve the linear program in a process that reiterates until the dual costs converge.

Additionally, the resource-constrained sequential recommender system includes user type modeler 1208. In particular, the user type modeler 1208 determines a user type for each user so the linear program manager 1204 can choose the correct recommendation policy for the respective user type. In one or more embodiments, the user type modeler 1208 uses Thompson sampling to sample a user type for each user. In particular, the user type modeler 1208 samples an initial user type for a user and, after observing the user's reaction to a recommendation, updates the data associated with that user and re-samples the user type based on the updated data. In some embodiments, the user type modeler 1208 employs a MOMDP approach to in order to determine a user's type. Further, some embodiments the user type modeler 1208 employ one or more of various methods (e.g., $Q_{MDP}$, SARSOP, or bounded belief tree) to solve the MOMDP and determine the user's type.

As shown in FIG. 12, the resource-constrained sequential recommender system 108 also includes data storage 1210. In particular, data storage 1210 includes model data 1212, user data 1214, and capacity data 1216. Model data 1212 stores the models built by multi-agent recommender modeler 1202. Additionally, model data 1212 stores the linear program and the planner algorithm used by linear program manager 1204 and planner problem manager 1206 respectively. Further, model data 1212 stores the various models used by user type modeler 1208 to determine a user type for each user.

User data 1214 stores any information regarding a particular user. In particular, user data 1214 stores any information that indicates a user type. For example, user data 1214 stores any information previously known about a user so that user type modeler 1208 can make an initial determination regarding the user's type. Additionally, user data 1214 stores information regarding a user's reaction to a recommendation so that user type modeler 1208 can update its determination regarding the user's type (e.g., through re-sampling the user type using Thompson sampling).

Capacity data 1216 stores information regarding the constraints placed on resources associated with various available points of interest. For example, capacity data 1216 stores capacity limits for each resource. Additionally, capacity data 1216 stores updated information indicating changes in a given resource's available capacity. In particular, updated information indicates changes in available capacity due to user reactions to recommendations.

As shown in FIG. 12, the resource-constrained sequential recommender system 108 also includes analytics data storage 1218. In particular, analytics data storage 1218 includes user type data 1220 and policy data 1222. User type data 1220 stores information regarding user types. In particular, user type data 1220 stores information indicating which user type is associated with a set of features held by a particular user. Policy data 1222 stores information used to generate a recommendation policy for a particular user type. In particular, policy data 1222 stores information indicating which points of interest a particular user would be interested in.

Figure 13:
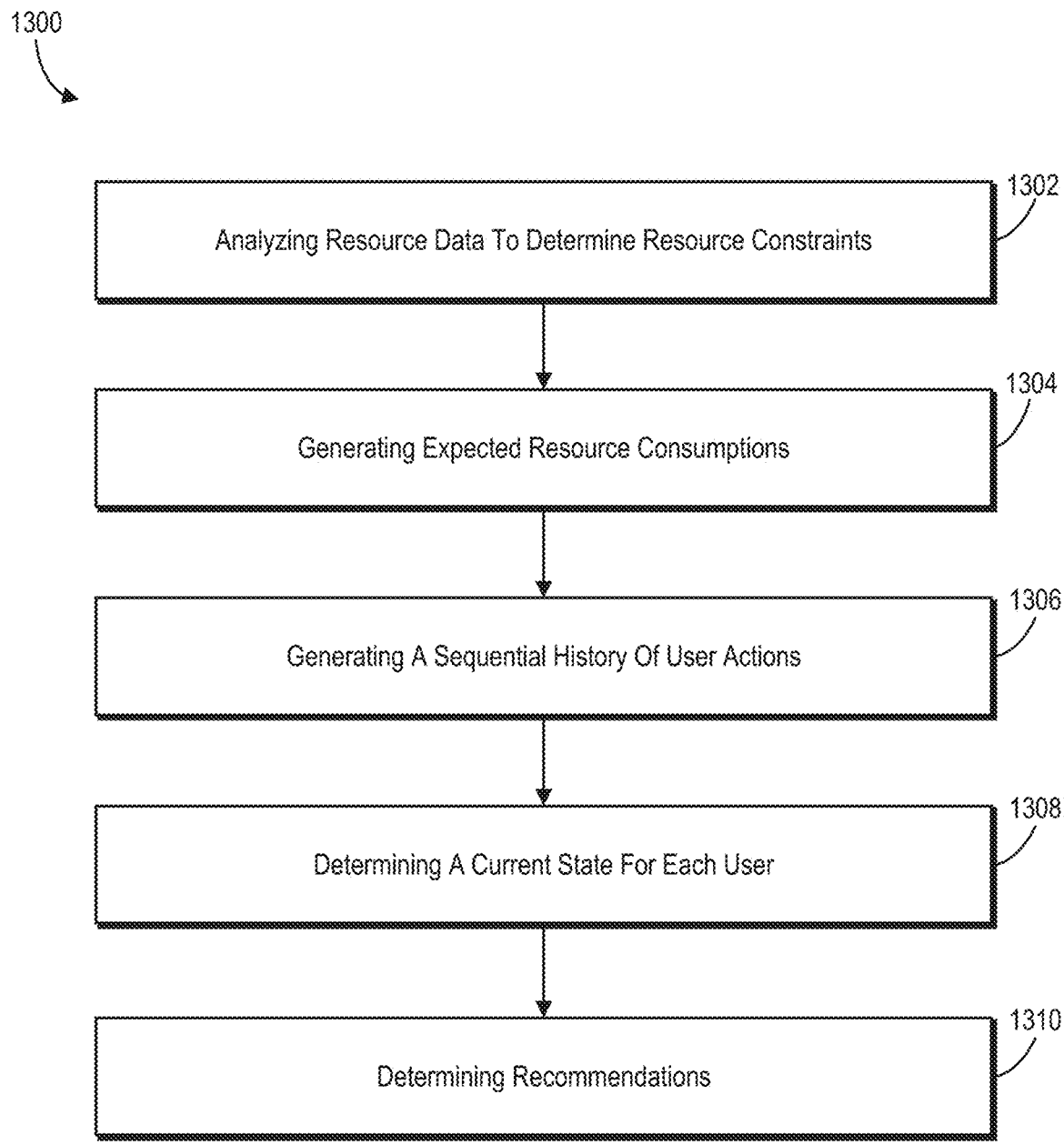
FIG. 13 illustrates a flowchart of a series of acts used to generate real-time recommendations for users.

Turning now to FIG. 13, this figure illustrates a series of acts 1300 to generate real-time recommendations for users. While FIG. 13 illustrates acts according to one embodiment, alternative embodiments may omit, add to, reorder, and/or modify any of the acts shown in FIG. 13. The acts of FIG. 13 can be performed as part of a method. In one or more embodiments, a non-transitory computer readable storage medium can comprise instructions that, when executed by one or more processors, cause a computing device to perform the acts of FIG. 13. In still further embodiments, a system can perform the acts of FIG. 13.

The series of acts 1300 includes an act 1302 of analyzing resource data to determine resource constraints. For example, act 1302 involves analyzing resource data to determine a plurality of resource constraints associated with a plurality of points of interest, wherein the plurality of resource constraints provide limitations on a capacity of each resource associated with the plurality of points of interest. In one or more embodiments, analyzing the resource data involves accessing a database that stores the data and extracting the data from the database.

The series of acts 1300 also includes an act 1304 of generating expected resource consumptions. For example, act 1304 involves generating a plurality of expected resource consumptions that provide expected uses of each resource associated with the plurality of points of interest subject to the plurality of resource constraints. In one or more embodiments, generating the expected resource consumptions involves using the resource consumption function of the CPOMDP.

The series of acts 1300 further includes an act 1306 of generating a sequential history of user actions. For example, act 1306 involves generating a sequential history of user actions for each of the plurality of users based on observing state transitions of each user of the plurality of users. In one or more embodiments, the sequential history of user actions of a user associates previous locations of the user with respect to one of the plurality of points of interest and a time at which the user was at the location.

Additionally, the series of acts 1300 includes an act 1308 of determining a current state for each user. For example, act 1308 involves determining a current state for each user of the plurality of users. In one or more embodiments, a state of a user associates a location of the user with respect to one of the plurality of points of interest and a time at which the user was at the location and wherein a state transition tracks a change of the user from a previous state to a subsequent state.

The series of acts 1300 also includes an act 1310 of determining recommendations. For example, the act 1310 involves determining recommendations for the plurality of users by solving a constrained linear program that takes into account user types and that is based on the plurality of resource constraints, the plurality of expected resource consumptions, the sequential history of user actions for each of the plurality of users, and the current state of each user. In one or more embodiments, determining recommendations for the plurality of users by solving the constrained linear program that takes into account user types includes: determining a user type for each user of the plurality of users; solving the constrained linear program using column generation to obtain a mix of recommendation policies for the plurality of users based on the user type of each user of the plurality of users; and determining a recommendation for each user of the plurality of users based on the mix of recommendation policies.

In particular, in one or more embodiments, determining a user type for each user of the plurality of users involves determining a user type using Thompson sampling. In some embodiments, determining a user type involves generating a belief tree comprising a plurality of belief points. In particular, a belief point comprises a probability distribution over user types. The resource-constrained sequential recommender system 108 can determine the user type for each user of the plurality of users based on the probability distribution associated with a current belief point of each user. In one or more embodiments, generating the belief tree involves determining a regret value associated with the belief point and excluding the belief point from the belief space if the regret value associated with the belief point is below a regret threshold. In particular, the regret value indicates a loss in value resulting from selecting a recommendation policy associated with the belief point that does not match a true user type. Further, in some embodiments, the resource-constrained sequential recommender system 108 excludes the belief point from the belief space if a probability of reaching the belief point does not exceed a probability threshold.

In one or more embodiments, solving the constrained linear program using column generation involves solving the linear program to obtain a set of costs. In particular, each cost in the set of costs indicates an increase in value for a recommended point of interest if the recommended point of interest acquired a larger capacity. The resource-constrained sequential recommender system 108 can input the set of costs into a planner algorithm to generate a new policy for each user of the plurality of users. In particular, the new policy is an additional input into the linear program. In one or more embodiments, the resource-constrained sequential recommender system 108 subsequently solves the linear program until the set of costs converges. In other words, the resource-constrained sequential recommender system 108 iterates the process of solving the linear program, inputting the resulting costs into the planner algorithm and inputting the new policy back into the linear program until the costs obtained from the linear program stop converging.

In one or more embodiments, the series of acts 1300 further includes issuing a recommendation to the plurality of users and observing their reactions to the recommendations (not shown). For example, these acts involve issuing a recommendation to each user of the plurality of users based on the determined recommendations. Subsequently, the resource-constrained sequential recommender system 108 can determine a reaction of each user of the plurality of users to the recommendations. In particular, the resource-constrained sequential recommender system 108 can determine whether each user followed or ignored the recommendation. In embodiments where the resource-constrained sequential recommender system 108 issues dual recommendations, the resource-constrained sequential recommender system 108 may determine whether each user selected a preferred recommendation. In one or more embodiments, the resource-constrained sequential recommender system 108 can then update the user type of each user of the plurality of users based on the determined reaction. Further, the resource-constrained sequential recommender system 108 can update the resource data based on the reaction of each user of the plurality of users.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the image composite system to adversarially train and employ a generative adversarial network, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 14:
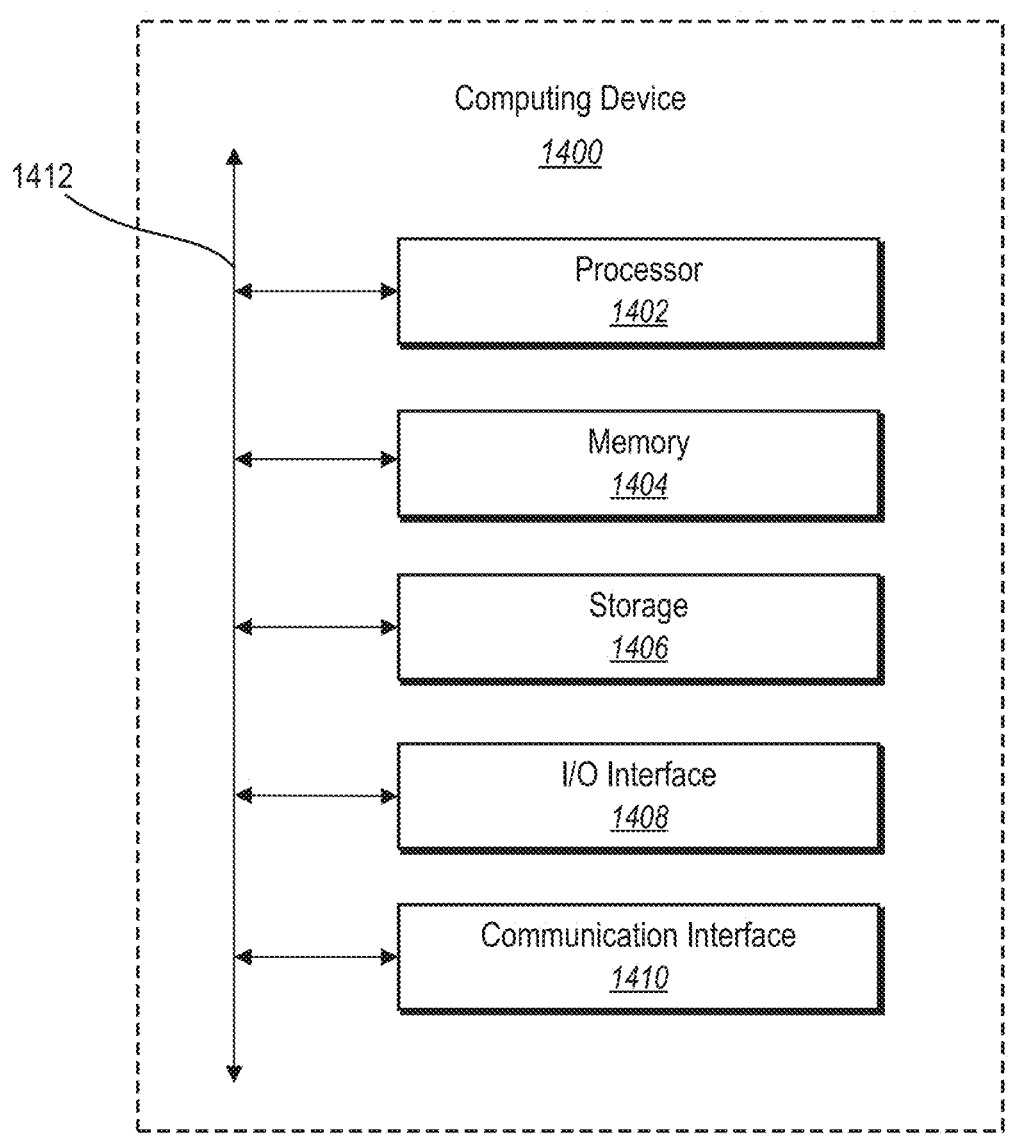
FIG. 14 illustrates a block diagram of an exemplary computing device in accordance with one or more embodiments.

FIG. 14 illustrates a block diagram of an exemplary computing device 1400 that may be configured to perform one or more of the processes described above. One will appreciate that one or more computing devices, such as the computing device 1400 may represent the computing devices described above (e.g., client devices 112a-112n or server(s) 104). In one or more embodiments, the computing device 1400 may be a mobile device (e.g., a mobile telephone, a smartphone, a PDA, a tablet, a laptop, a camera, a tracker, a watch, a wearable device, etc.). In some embodiments, the computing device 1400 may be a non-mobile device (e.g., a desktop computer or another type of client device). Further, the computing device 1400 may be a server device that includes cloud-based processing and storage capabilities.

As shown in FIG. 14, the computing device 1400 can include one or more processor(s) 1402, memory 1404, a storage device 1406, input/output ("I/O") interfaces 1408, and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, the storage device 1406 can include a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (MC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of computing device 1400 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment in which availability of limited resources is tracked, a computer-implemented method for generating real time point-of-interest recommendations for users, comprising:
analyzing resource data to determine a plurality of resource constraints associated with a plurality of points of interest, wherein the plurality of resource constraints provide limitations on a capacity of each resource associated with the plurality of points of interest;
determining population dynamics that correspond to probabilities of users entering a structure associated with the plurality of points of interest across a time window and probabilities of the users exiting the structure across the time window;
generating a plurality of expected resource consumptions that provide expected uses of each resource associated with the plurality of points of interest based on the population dynamics and subject to the plurality of resource constraints;
generating a sequential history of user actions for each user of a plurality of users based on observing state transitions of each user of the plurality of users;
determining a current state for each user of the plurality of users; and
performing a step for determining recommendations for the plurality of users by taking into account user types, the plurality of resource constraints, the plurality of expected resource consumptions, the sequential history of user actions for each user of the plurality of users, and the current state of each user.

2. The computer-implemented method of claim 1, wherein the current state of each user corresponds to a state of the user that associates a location of the user with respect to one of the plurality of points of interest and a time at which the user was at the location and wherein a state transition of the user tracks a change of the user from a previous state to a subsequent state.

3. The computer-implemented method of claim 1, wherein performing the step for determining recommendations for the plurality of users by taking into the account user types comprises determining a user type for each user of the plurality of users using Thompson sampling.

4. The computer-implemented method of claim 1, wherein performing the step for determining recommendations for the plurality of users by taking into account the user types comprises determining a user type of the user types by:
building a mixed-observability Markov decision process; and
determining a solution to the mixed-observability Markov decision process using a solver.

5. The computer-implemented method of claim 4, wherein the solver comprises a bounded belief tree solver that bounds a size of a belief space by:
determining a regret value associated with a belief point, wherein the regret value indicates a loss in value resulting from selecting a recommendation policy associated with the belief point that does not match a true user type; and
excluding the belief point from the belief space if:
the regret value associated with the belief point is below a regret threshold; or
a probability of reaching the belief point does not exceed a probability threshold.

6. A non-transitory computer readable storage medium including a set of instructions that, when executed by at least one processor, cause a computing device to:
analyze resource data to determine a plurality of resource constraints associated with a plurality of points of interest, wherein the plurality of resource constraints provide limitations on a capacity of each resource associated with the plurality of points of interest;
determine population dynamics that correspond to probabilities of users entering a structure associated with the plurality of points of interest across a time window probabilities of the users exiting the structure across the time window;
generate a plurality of expected resource consumptions that provide expected uses of each resource associated with the plurality of points of interest based on the population dynamics and subject to the plurality of resource constraints;
generate a sequential history of user actions for each user of a plurality of users based on observing state transitions of each of the plurality of users;
determine a current state for each user of the plurality of users; and
determine recommendations for the plurality of users by solving a constrained linear program that takes into account user types and that is based on the plurality of resource constraints, the plurality of expected resource consumptions, the sequential history of user actions for each user of the plurality of users, and the current state of each user.

7. The non-transitory computer readable storage medium of claim 6, wherein the sequential history of user actions of each user associates previous locations of the user with respect to one of the plurality of points of interest and a time at which the user was at each of the previous locations.

8. The non-transitory computer readable storage medium of claim 6, further comprising instructions that, when executed by the at least one processor, cause the computing device to:
issue a recommendation to each user of the plurality of users based on the recommendations;
determine a reaction of each user of the plurality of users to the recommendations; and
update a user type of each user of the plurality of users based on the reaction.

9. The non-transitory computer readable storage medium of claim 6, wherein the instructions, when executed by the at least one processor, cause the computing device to determine recommendations for the plurality of users by solving the constrained linear program that takes into account the user types by:
determining a user type for each user of the plurality of users;
solving the constrained linear program using column generation to obtain a mix of recommendation policies for the plurality of users based on the user type of each user of the plurality of users; and
determining a recommendation for each user of the plurality of users based on the mix of recommendation policies.

10. The non-transitory computer readable storage medium of claim 9, wherein solving the constrained linear program using column generation comprises:
solving the constrained linear program to obtain a set of costs, wherein each cost in the set of costs indicates an increase in value for a recommended point of interest if the recommended point of interest acquired a larger capacity; and inputting the set of costs into a planner algorithm to generate a new policy for each user of the plurality of users, wherein the new policy is an additional input into the constrained linear program.

11. The non-transitory computer readable storage medium of claim 9, wherein determining the user type for each user of the plurality of users comprises determining a user type using Thompson sampling.

12. The non-transitory computer readable storage medium of claim 9, wherein determining the user type for each user of the plurality of users comprises:

generating a belief tree comprising a plurality of belief points, wherein a belief point comprises a probability distribution over user types; and determining the user type for each user of the plurality of users based on the probability distribution associated with a current belief point of each user.

13. The non-transitory computer readable storage medium of claim 12, wherein generating the belief tree comprises:

determining a regret value associated with the belief point wherein the regret value indicates a loss in value resulting from selecting a recommendation policy associated with the belief point that does not match a true user type; and excluding the belief point from the belief tree if the regret value associated with the belief point is below a regret threshold.

14. The non-transitory computer readable storage medium of claim 13, wherein generating the belief tree further comprises excluding the belief point from the belief tree if a probability of reaching the belief point does not exceed a probability threshold.

15. A system for generating real-time point-of-interest recommendations to users, comprising:

at least one server; and at least one non-transitory computer readable storage medium storing instructions thereon that, when executed by the at least one server, cause the system to:

analyze resource data to determine a plurality of resource constraints associated with a plurality of points of interest, wherein the plurality of resource constraints provide limitations on a capacity of each resource associated with the plurality of points of interest;

determine population dynamics that correspond to probabilities of users entering a structure associated with the plurality of points of interest across a time window and probabilities of the user exiting the structure across the time window;

generate a plurality of expected resource consumptions that provide expected uses of each resource associated with the plurality of points of interest based on the population dynamics and subject to the plurality of resource constraints;

generate a sequential history of user actions for each user of a plurality of users based on observing state transitions of each of the plurality of users;

determine a current state for each user of the plurality of users; and generate a recommendation policy for each user of the plurality of users, wherein the recommendation policy comprises real-time point-of-interest recommendations based on a user type, by:

determining a user type for each user of the plurality of users; and solving a linear program that takes into account the user type and is based on the plurality of resource constraints, the plurality of expected resource consumptions, the sequential history of user actions for each user of the plurality of users, and the current state of each user using column generation to obtain a mix of recommendation policies for the plurality of users.

16. The system of claim 15, wherein solving the linear program using column generation comprises:

solving the linear program to obtain a set of costs, wherein each cost in the set of costs indicates an increase in value for a recommended point of interest if the recommended point of interest acquired a larger capacity; and inputting the set of costs into a planner algorithm to generate a new policy for each of the plurality of users, wherein the new policy is an additional input into the linear program.

17. The system of claim 16, wherein solving the linear program using column generation further comprises solving the linear program until the set of costs converges.

18. The system of claim 15, further comprising instructions that, when executed by the at least one server, cause the system to:

issue a recommendation to each user of the plurality of users based on the recommendations;

determine a reaction of each user of the plurality of users to the recommendations; and update the user type of each user of the plurality of users based on the reaction.

19. The non-transitory computer readable storage medium of claim 6, wherein the instructions, when executed by the at least one processor, cause the computing device to determine the population dynamics that correspond to the probabilities of the users entering the structure associated with the plurality of points of interest across the time window and the probabilities of the user exiting the structure across the time window by determining the population dynamics that correspond to probabilities of the users accessing an online system hosted by one or more servers across the time window and probabilities of the users exiting the online system across the time window.

20. The non-transitory computer-readable storage medium of claim 6, further comprising instructions that, when executed by the at least one processor, cause the computing device to modify a state space and a transition function of a Markov decision process that models actions of the user to reflect the population dynamics, wherein the instructions, when executed by the at least one processor, cause the computing device to generate the plurality of expected resource consumptions that provide the expected uses of each resource associated with the plurality of points of interest based on the population dynamics by generating the plurality of expected resource consumptions utilizing the modified state space and the modified transition function.

* * * * *